(12) United States Patent
Holloway et al.

(10) Patent No.: US 10,965,937 B2
(45) Date of Patent: Mar. 30, 2021

(54) SYSTEMS AND METHODS FOR MONITORING ELECTRONIC DISPLAYS

(71) Applicant: Outdoorlink, Inc., Huntsville, AL (US)

(72) Inventors: Richard Holloway, Huntsville, AL (US); Peter Carter Weiland, Huntsville, AL (US)

(73) Assignee: Outdoorlink, Inc., Huntsville, AL (US)

( * ) Notice: Subject to any disclaimer, the term of this patent is extended or adjusted under 35 U.S.C. 154(b) by 0 days.

(21) Appl. No.: 16/752,270

(22) Filed: Jan. 24, 2020

(65) Prior Publication Data

US 2020/0244951 A1    Jul. 30, 2020

Related U.S. Application Data

(60) Provisional application No. 62/796,419, filed on Jan. 24, 2019, provisional application No. 62/903,083, filed on Sep. 20, 2019.

(51) Int. Cl.
*H04H 20/14*  (2008.01)
*H04H 60/29*  (2008.01)
*H04N 17/04*  (2006.01)
*H04N 5/265*  (2006.01)
*H04N 7/04*   (2006.01)
(Continued)

(52) U.S. Cl.
CPC .......... *H04N 17/04* (2013.01); *G06F 9/4401* (2013.01); *G06Q 30/0272* (2013.01); *G06Q 30/0277* (2013.01); *G06T 7/0002* (2013.01); *H04N 5/2253* (2013.01); *H04N 5/265* (2013.01); *H04N 7/04* (2013.01);
(Continued)

(58) Field of Classification Search
CPC ...... H04N 17/04; H04N 5/2253; H04N 5/265; H04N 7/04; H04N 21/44004; H04N 21/812; G06F 9/4401; G06Q 30/0272; G06Q 30/0277; G06T 7/0002; G06T 2207/10016; G06T 2207/30168
See application file for complete search history.

(56) References Cited

U.S. PATENT DOCUMENTS 8,441,574 B2    5/2013  Dunn et al.
8,544,033 B1    9/2013  Acharya
(Continued)

OTHER PUBLICATIONS

Excite Billboard Installation Instructions for 20mm and 23mm Pitch series signs, Adaptive Micro Systems, LLC, (Published on Mar. 19, 2008).
(Continued)

*Primary Examiner* — Kyu Chae
(74) *Attorney, Agent, or Firm* — Maynard Cooper & Gale, P.C.; Jon E. Holland

(57) ABSTRACT

A system for monitoring displayed content, such as advertisements, has at least one sensor that is used to monitor an electronic display and provide information about the operation of the display, such as the content being displayed or whether one or more components of the display are operating correctly. The sensor is selected, positioned, and/or otherwise configured to limit the its ability to collect information in the environment surrounding the display so as to reduce concerns about the use of the sensor in a private or secure environment. The system may be used to confirm that the hardware of the display system is operating correctly and displaying the proper content at the proper times.

30 Claims, 25 Drawing Sheets

(51) Int. Cl.
  *G06T 7/00* (2017.01)
  *H04N 5/225* (2006.01)
  *G06Q 30/02* (2012.01)
  *G06F 9/4401* (2018.01)
  *H04N 21/44* (2011.01)
  *H04N 21/81* (2011.01)

(52) U.S. Cl.
  CPC ............... *H04N 21/44004* (2013.01); *G06T 2207/10016* (2013.01); *G06T 2207/30168* (2013.01); *H04N 21/812* (2013.01)

(56) References Cited

U.S. PATENT DOCUMENTS

| | | | |
|---|---|---|---|
| 9,026,686 B2 | 5/2015 | Dunn et al. | |
| 9,812,047 B2 | 11/2017 | Schuch et al. | |
| 10,185,969 B1 | 1/2019 | Holloway et al. | |
| 10,313,037 B2 | 6/2019 | Laet et al. | |
| 10,325,536 B2 | 6/2019 | Schuch et al. | |
| 2003/0115591 A1 | 6/2003 | Wiessmueller et al. | |
| 2005/0160168 A1* | 7/2005 | Takanashi | G06F 3/14 709/224 |
| 2007/0271585 A1 | 11/2007 | Taguchi | |
| 2007/0280357 A1* | 12/2007 | Sung | H04N 21/4122 375/240.25 |
| 2008/0120181 A1 | 5/2008 | Chang | |
| 2009/0319231 A1 | 12/2009 | Beland et al. | |
| 2010/0153218 A1 | 6/2010 | Wilson | |
| 2010/0238352 A1* | 9/2010 | Dunn | G09F 19/14 348/598 |
| 2011/0063317 A1 | 3/2011 | Gharaat et al. | |
| 2012/0023516 A1* | 1/2012 | Wolinsky | H04H 60/31 725/12 |
| 2014/0152786 A1* | 6/2014 | Nicholson | H04N 21/812 348/61 |
| 2017/0366439 A1* | 12/2017 | Madgwick | H04L 43/12 |
| 2018/0075264 A1 | 3/2018 | Moriki et al. | |
| 2018/0324497 A1* | 11/2018 | Woods | G11B 27/10 |
| 2020/0005831 A1* | 1/2020 | Wallner | G11B 27/3045 |
| 2020/0059681 A1* | 2/2020 | Neumeier | H04N 21/23439 |

OTHER PUBLICATIONS

Jennings, et al., U.S. Appl. No. 15/202,359 entitled, "Systems and Methods for Monitoring Advertisements," filed Jul. 5, 2016.
"Notification of Transmittal of the International Search Report and the Written Opinion of the International Searching Authority, or the Declaration" for PCT/US2020/015054 dated Apr. 8, 2020.

* cited by examiner

100

Because only you can prevent forest fires!

110

Because only you can prevent forest fires!

120

Vote for X, for the people (Top View)

(Bottom View)

SYSTEMS AND METHODS FOR MONITORING ELECTRONIC DISPLAYS

CROSS REFERENCE TO RELATED APPLICATIONS

This application claims priority to U.S. Provisional Patent Application No. 62/796,419, entitled "Systems and Methods for Monitoring Electronic Advertisement Displays" and filed on Jan. 24, 2019, which is incorporated herein by reference. The application also claims priority to U.S. Provisional Patent Application No. 62/903,083, entitled "Systems and Methods for Monitoring Electronic Advertisements" and filed on Sep. 20, 2019, which is incorporated herein by reference.

RELATED ART

Advertising is important to business and the economy in general by helping distribute information and connecting consumers and vendors. One concern advertisers and advertising customers have is ensuring that their advertisements are properly displayed for the periods contracted. Traditionally, remote cameras (distant from the advertisement) have been used to capture images of the advertisements, thereby allowing remote users to verify proper advertising content and panel integrity. However, this approach has various disadvantages including the cost of the equipment installations, the need for human verification, and also there are many areas where use of cameras is limited due to security or privacy reasons (e.g., in and around airports, train stations, secured facilities, etc.). In such environments, enabling remote verification of advertisements can be problematic.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2b illustrates a frame of the animated advertisement of FIG. 2a.
FIG. 2c illustrates a frame of the animated advertisement of FIG. 2a.
FIG. 2d illustrates a frame of the animated advertisement of FIG. 2a.
FIG. 4a illustrates an exemplary power consumption for the advertisement of FIG. 1a.

DETAILED DESCRIPTION

Figures 1A, 1B, 1C:
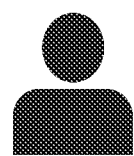
FIG. 1a illustrates an exemplary static advertisement.
FIG. 1b illustrates an exemplary static advertisement.
FIG. 1c illustrates an exemplary static advertisement.
Figure 2A:
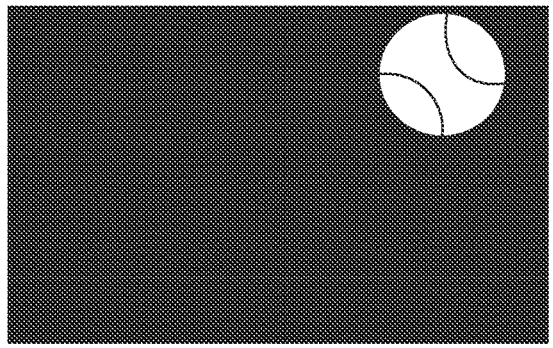
FIG. 2a illustrates a frame of an animated advertisement.
Figure 2B:
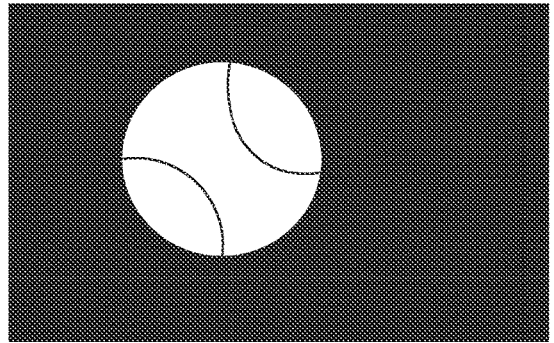
Figure 2C:
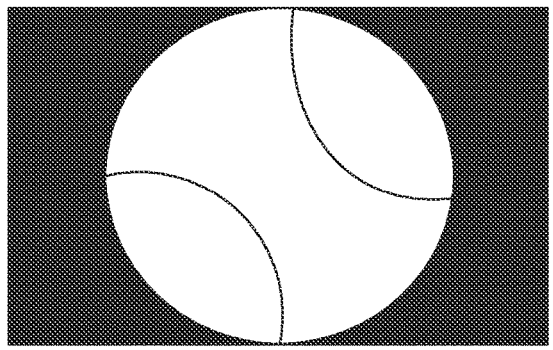
Figure 2D:
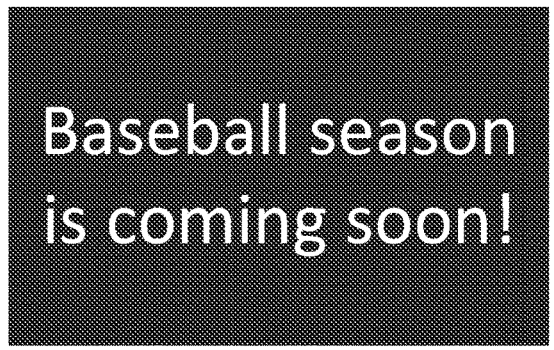

The present disclosure generally pertains to systems and methods for monitoring systems for displaying electronic content, such as electronic advertisements. In accordance with some embodiments of the present disclosure, circuitry is used to monitor one or more components of an advertisement display system (or other types of display system) and provide information about the operation of the system, such as the content being displayed or whether one or more components of the display system are operating correctly. Such circuitry may be configured to monitor various aspects of the display system, such as the image displayed by the system, the power signal provided to one or more components of the display system, temperature of such components, or video data stored or transmitted through the system, to confirm correct operation of the system. The circuitry used to monitor the image displayed by the display device is selected, positioned, and/or otherwise configured to limit its ability to collect information in the environment surrounding the display so as to reduce concerns about the use of the circuitry in a private or secure environment. There are various types of sensors that may be used in an effort to achieve this effect.

As an example, one or more power sensors may be used to detect power consumption fluctuations of a display screen that is displaying electronic advertisements. Similarly, one or more power sensors may be used to detect power consumption fluctuations of one or more display system components. The power sensors may be coupled to a content monitor, which gathers data regarding the power consumption and monitors how the consumption changes. This data may be processed, analyzed, and compared against power signatures associated with the various content (e.g., advertisements) in order to verify both the integrity of the hardware of the display system and the content of the displayed content.

In another exemplary embodiment, one or more optical sensors are mounted close to an edge of the display device (e.g., on the frame or border) or on the display device itself to collect visual data regarding at least a portion the displayed content. The collected data is compared against optical signatures or other data to verify both the integrity of the hardware of the display device and the content of the displayed content.

In yet another exemplary embodiment, both optical sensors and power sensors are used to verify the integrity of the hardware of the display device and the displayed content. Regardless of the types of sensors used, the data collected to monitor the components and operation of the system may be communicated to a server or other location in order to allow remote users to access such data for various purposes, such as verifying the operation of the display hardware or the content displayed by the system. Additionally, real-time or post-processing of the collected data may be used to take manual (by human user) or automatic (by system) action on the display system. Such actions include, but are not limited to, enabling power to hardware components, disabling power to hardware components, power cycling power to hardware components, and scheduling power (i.e. specific time period, day of week) to hardware components.

Displayed content, such as electronic advertisements, may come in many forms on digital signs. A static advertisement 100, 110, and 120, such as one of the advertisements displayed in FIGS. 1a-c, may contain text or images that do not change for at least a specified period, such as the term of a contract associated with the advertisement. Advertisements may also share the same space with other advertisements by switching between multiple advertisements. For example, five different advertisements may be displayed by switching between advertisements periodically (e.g., 10-30 seconds, every minute, every 5 minutes, or some other time period). Advertisements may be animated, such as is illustrated by FIGS. 2a-d. The frames of the advertisement may be displayed for different periods of time. For example, each frame of FIGS. 2a-c may be shown for about 0.1 to 5 seconds and the last frame may be displayed for the duration of the advertisement (e.g., another 10-30 seconds). Alternatively, the frames may switch at a uniform, fixed rate. Advertisements may also take the form of videos shown at for example 10, 30, 60, or 120 frames per second.

Figure 3:
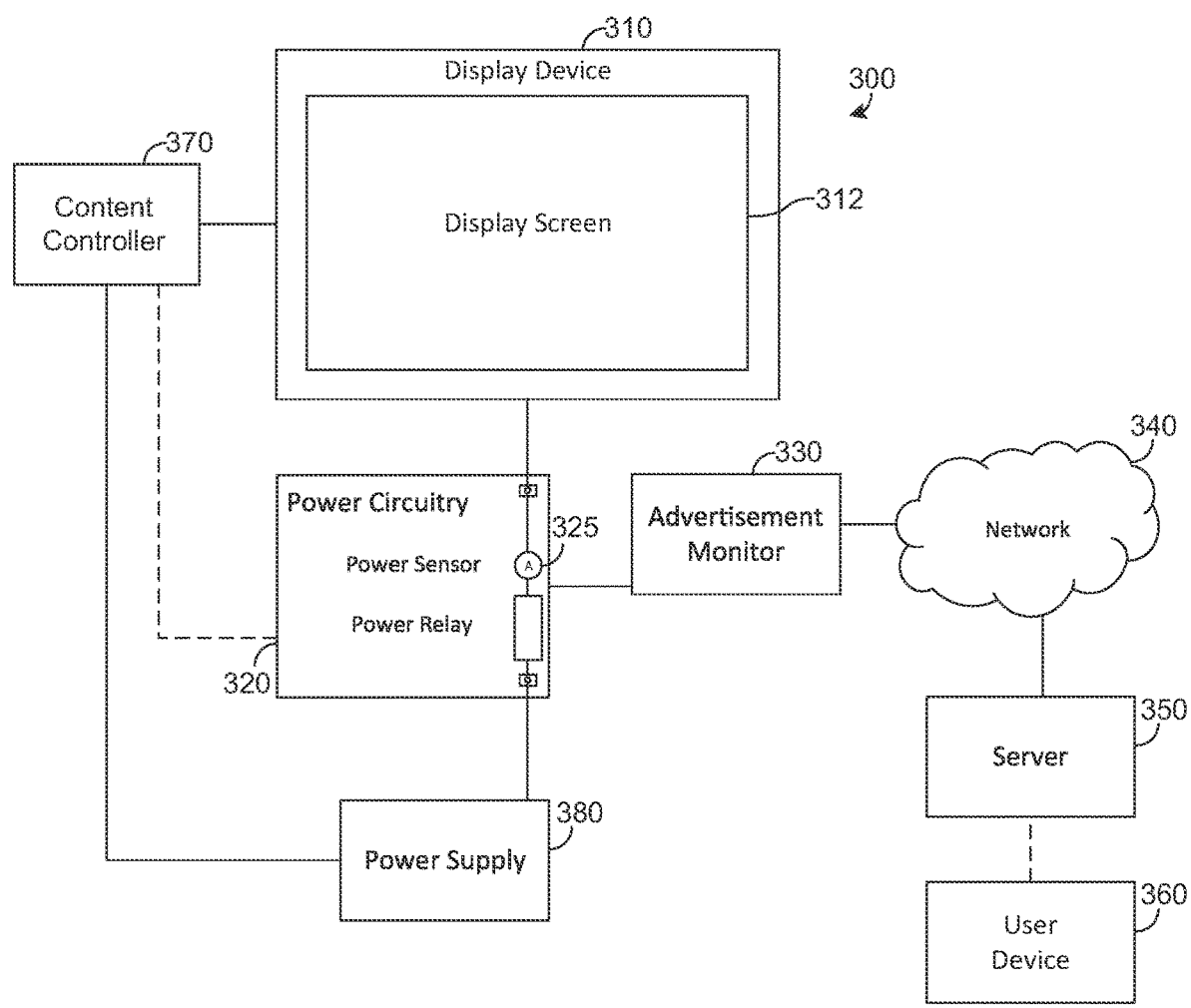
FIG. 3 is a block diagram illustrating an exemplary embodiment of an advertisement monitoring system.

Displaying images on a digital sign consumes power. FIG. 3 depicts an exemplary embodiment of an advertisement monitoring system 300 that monitors an advertisement by sensing power delivered to the hardware displaying the advertisement. As shown by FIG. 3, the system 300 comprises an electronic display device 310 that is used to display electronic content, such as advertisements. The display device 310 has a display screen 312 from which images are displayed. In some embodiments, the display screen 312 comprises multiple display panels for which each panel receives a separate power signal and displays only a portion of the overall image. In other embodiments, the display screen 312 may comprise a single display panel or other type of display component for displaying images.

The display device 310 is coupled to power circuitry 320 for measuring and delivering power to the display device 310. In this regard, the power circuitry 320 may be coupled in series between a power supply 380 and the display device 310 or otherwise in a position to detect or meter the power of the display device 310. For example, the power circuitry 320 may contain a power sensor 325 for detecting a parameter indicative of the power consumed, such as current, voltage, or other parameters or combinations of parameters. The power circuitry 320 may also contain power switches (e.g., relays) or other types of devices for deactivating the display device 310 or other display system hardware components in case there is a problem, such as a determination that the display device 310 is not displaying the expected content or otherwise performing as expected. The display device 310 might be indoors or outdoors, free standing, mounted to a wall or other structure, or otherwise positioned as may be desired.

The power circuitry 320 is also coupled to a content monitor 330 having circuitry for monitoring the operation of the system 300 in displaying content. In various embodiments described below, the content monitor 330 is used to monitor the display of electronic advertisements and will be referred to hereafter for simplicity of illustration as "advertisement monitor." However, it should be emphasized that the content monitor 330 may be used monitor the display of other types of content using the same techniques described hereafter for monitoring advertisements.

In some embodiments, the advertisement monitor 330 is configured to collect and process sensor data associated with the display device 310, as will be described in more detail below. The advertisement monitor 330 may communicate through a network 340 to a server 350. The network 340 may comprise various known networks, such as any local area network (LAN), wide area network (WAN), such as the Internet, or any combination of networks such as a cellular network in combination with the Internet. Additionally, customers, operators, technicians or other authorized persons may use a user device 360 to connect directly or through a network (e.g., network 340 or other network) to the server 350. The advertisement monitor 330 may communicate with the server 350 constantly, on demand, periodic intervals (e.g., daily or weekly), or sporadically.

By measuring the power consumed by different advertisements, the advertisements may be distinguished. For example, for LED-based displays, each pixel may be illuminated by one to three separate light sources, e.g., diodes. Hence, the amount of energy consumed to display one color (e.g., blue) may be dramatically different than from that of another color, such as red or white.

Figure 4A:
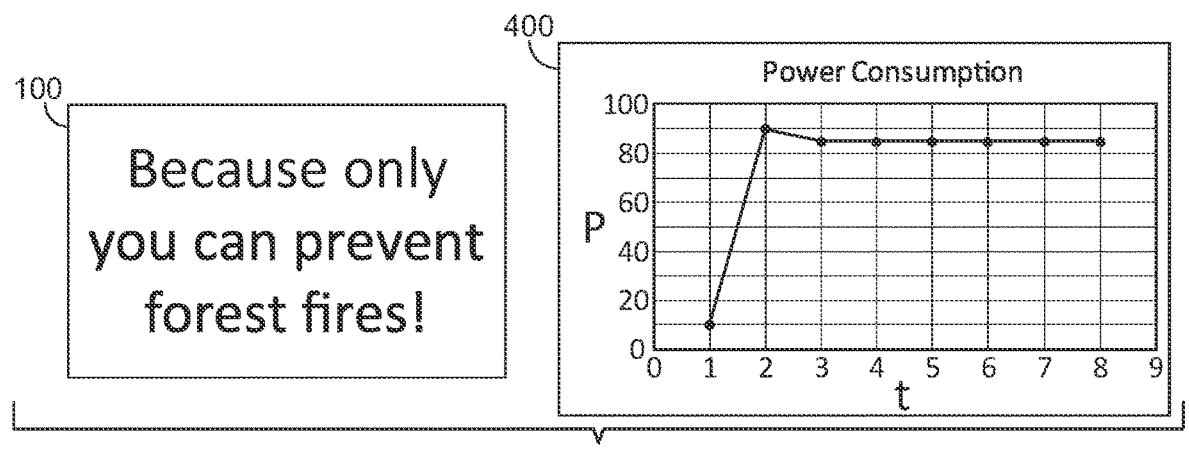
Figure 4B:
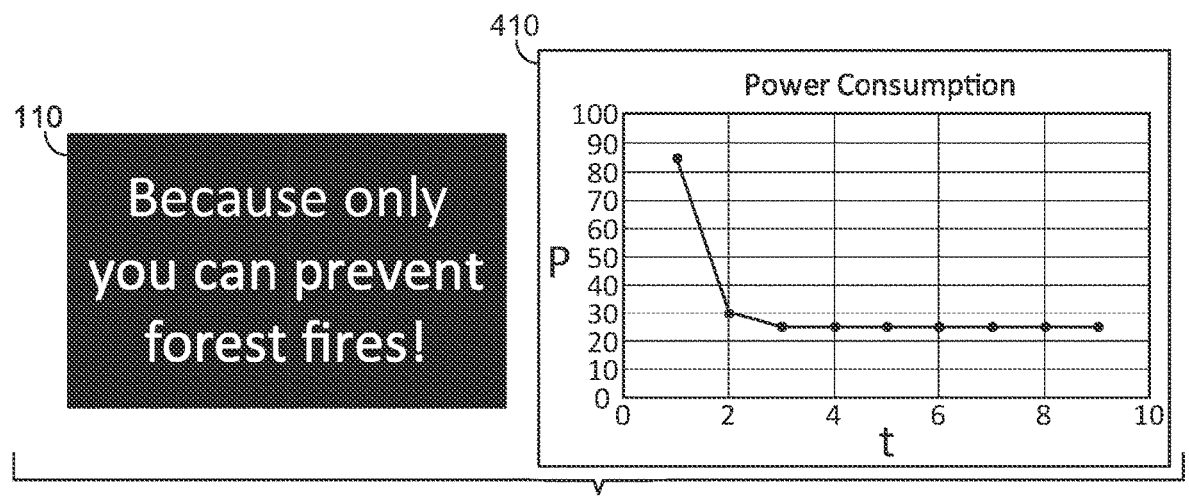
FIG. 4b illustrates an exemplary power consumption for the advertisement of FIG. 1b.
Figure 4C:
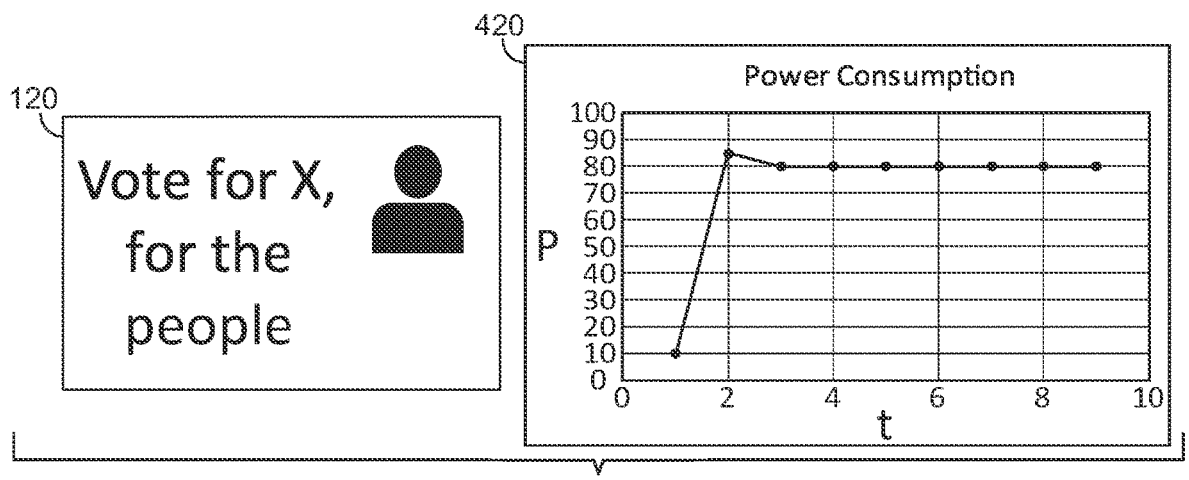
FIG. 4c illustrates an exemplary power consumption for the advertisement of FIG. 1c.

FIGS. 4a-c illustrate differences in power consumption of a display device while displaying the advertisements from FIGS. 1a-c. Regarding advertisement 100, because the image is predominantly white, significantly more power may be consumed to display the image than would be consumed to display advertisement 110, which is predominantly black or a dark color. Notably, for each advertisement shown by FIGS. 4a-c, the initial changes in power consumption from point 1 to point 2 indicate a transition from a previous display image. As illustrated by FIGS. 4a and 4c, similar advertisements 100 and 120 might have similar power consumption profiles 400 and 420. In the examples shown by FIGS. 4a-c, an average power consumption of about 85 units of power (e.g., Watts) may indicate advertisement 100 is being displayed, an average power consumption of about 25 units of power may indicate advertisement 110 is being displayed, and an average power consumption of about 80 units of power may indicate advertisement 120 is being displayed. Hence, a stable power consumption for a period of time could be an identifiable power signature.

Figure 5A:
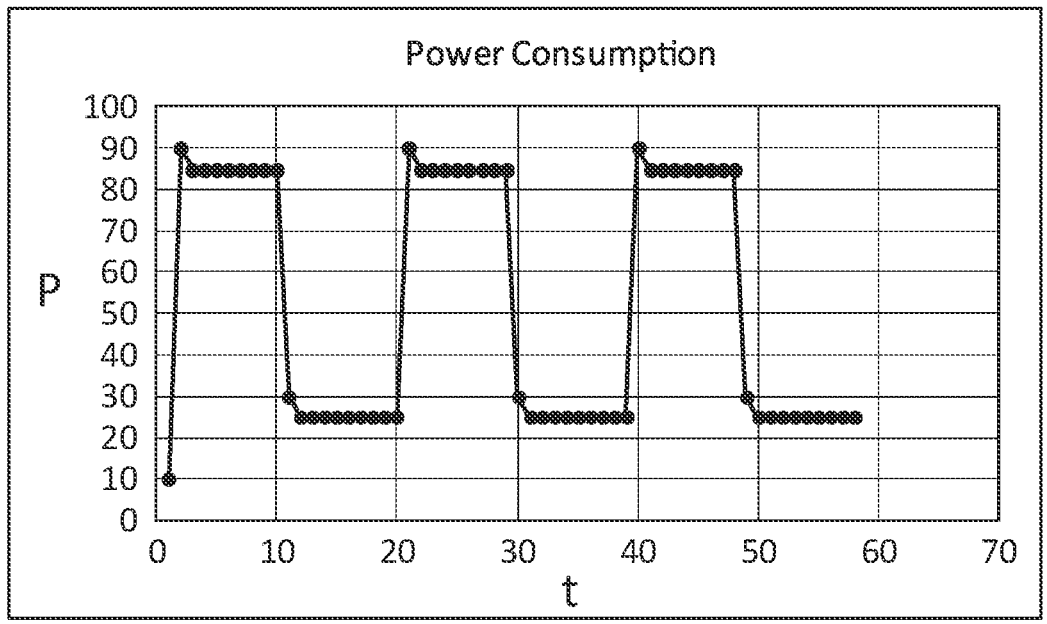
FIG. 5a illustrates an exemplary power consumption of a display device cycling between different static advertisements of FIGS. 1a-c.
Figure 5B:
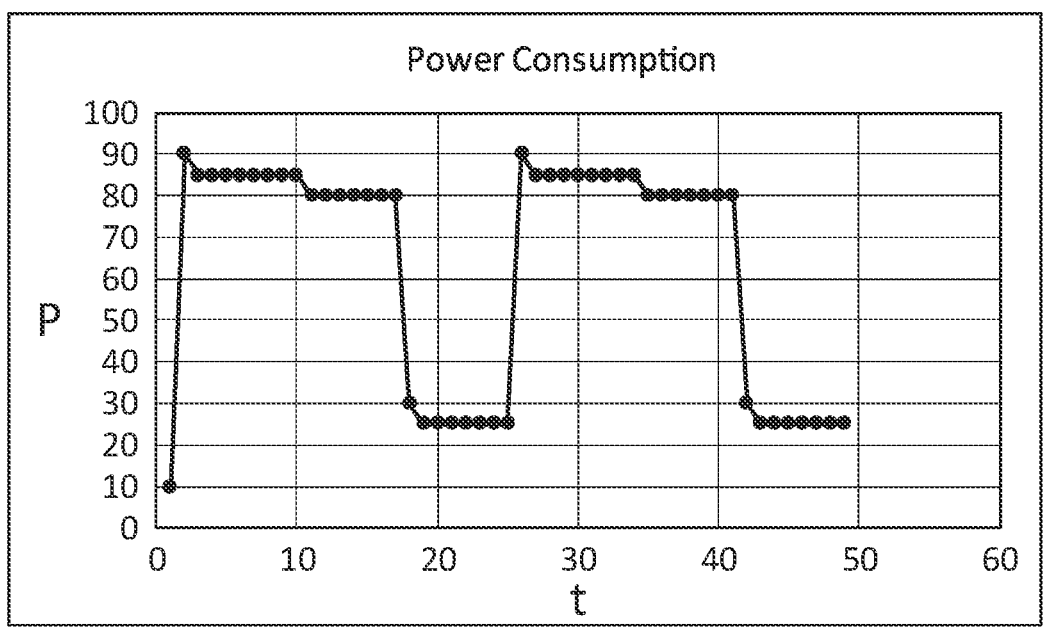
FIG. 5b illustrates an exemplary power consumption of a display device cycling between different static advertisements of FIGS. 1a-c.

FIG. 5a shows an exemplary power consumption graph of a display device 310 that repetitively alternates between advertisements 100 and 110. FIG. 5b shows an exemplary power consumption graph of a display device 310 that repetitively alternates between advertisements 100, 120, and 110. The advisement monitor 330 can identify which advertisement is being displayed at a particular moment by correlating the power consumed with the expected power consumption for that advertisement (e.g. a measurement of constant 85 watts/hour power consumption over a threshold period of time might indicate advertisement 100 is being displayed). That is, the advertisement monitor 330 may store data indicative of a power consumption signature for an advertisement, and determine that the advertisement is being displayed when the power consumption profile measured for a given interval sufficiently matches (within a margin of error) the defined signature. In some embodiments, the advertisement monitor 330 could alternatively use the expected change between different power consumption levels to identify the displayed advertisement instead of specific power consumption level alone. Hence, if two advertisements are within a threshold of each other but the system detects a measurable increase or decrease for threshold periods of time, the increase or decrease can be indicative of which advertisement is being displayed.

The advertisement monitor 330, by using readings from the power consumption sensor(s) 325, can log when and for how long each of the advertisements was displayed. If the power consumed does not match within predetermined thresholds for advertisements in the expected advertisement display schedule or in an advertisement database, then an alert can be sent to one or more users (e.g., a system administrator) including the details of what the sensors 1120 detected (e.g., recorded power levels) and the times they were detected. These alerts could indicate that the wrong or unexpected advertisement was being displayed at a certain time or the display device 310 is malfunctioning. If the timing of the power consumption changes or does not match what is expected, it could also indicate an operational problem (e.g., the display device 310 has frozen or is otherwise not performing as expected), and the advertisement monitor 330 could send an alert to one or more users. If the display device 310 has a problem (e.g., it has frozen), a human operator could send a command to the advertisement monitor 330 to take an action to mitigate the problem, such as trigger the power switches to power cycle the display device 310 or the content controller 370. In some embodiments, the advertisement monitor 330 may be configured to automatically take such actions without the need of human input.

If the measured power profile does not sufficiently match the expected signature for one or more advertisements, it is possible that one or more components of the display system has failed or is beginning to fail. In such a case, the advertisement monitor 330 may be configured to trigger an alert, as described above, such as transmitting a message of the anomaly to one or more users.

Figure 6:
FIG. 6 illustrates varying power consumptions of a display device for the animated advertisement from FIGS. 2a-d.
Figure 6:
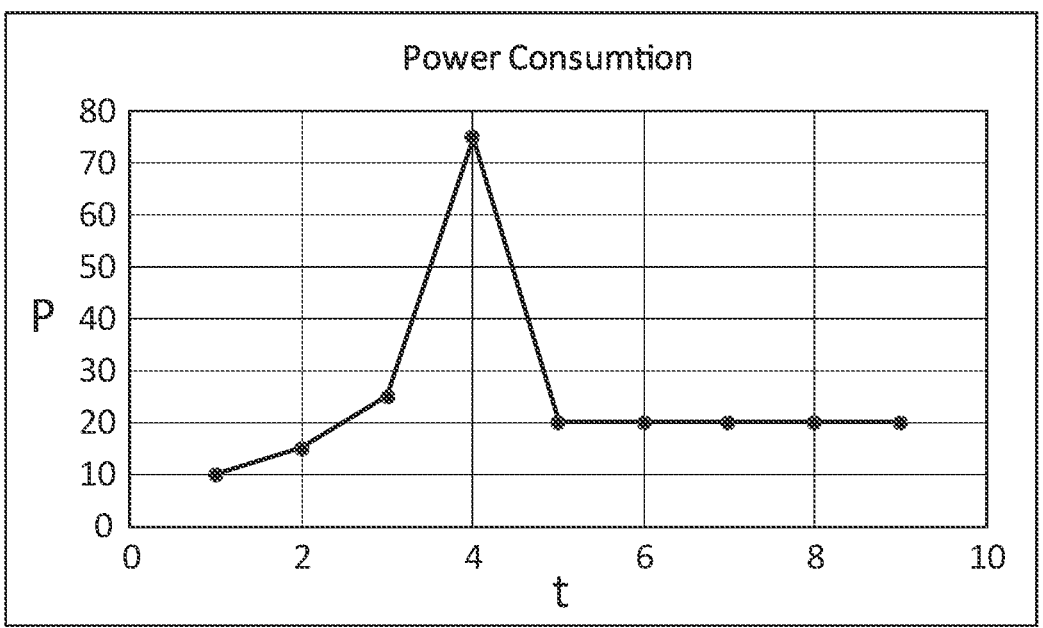

FIG. 6 displays an exemplary power consumption profile of the animation depicted in FIGS. 2a-d. As the ball in the images gets larger, the power consumption increases as more pixels are used to display the ball. However, the power consumption decreases when the ball is replaced with text. The increases and decreases in power consumption over time may define a unique signature that is different than the signatures of other advertisements. The advertisement monitor 330 may be configured to determine that the animated advertisement of FIGS. 2a-d is being displayed when the measured power consumption profile over time substantially matches the signature (within a specified margin of error) shown by FIG. 6.

Figure 7:
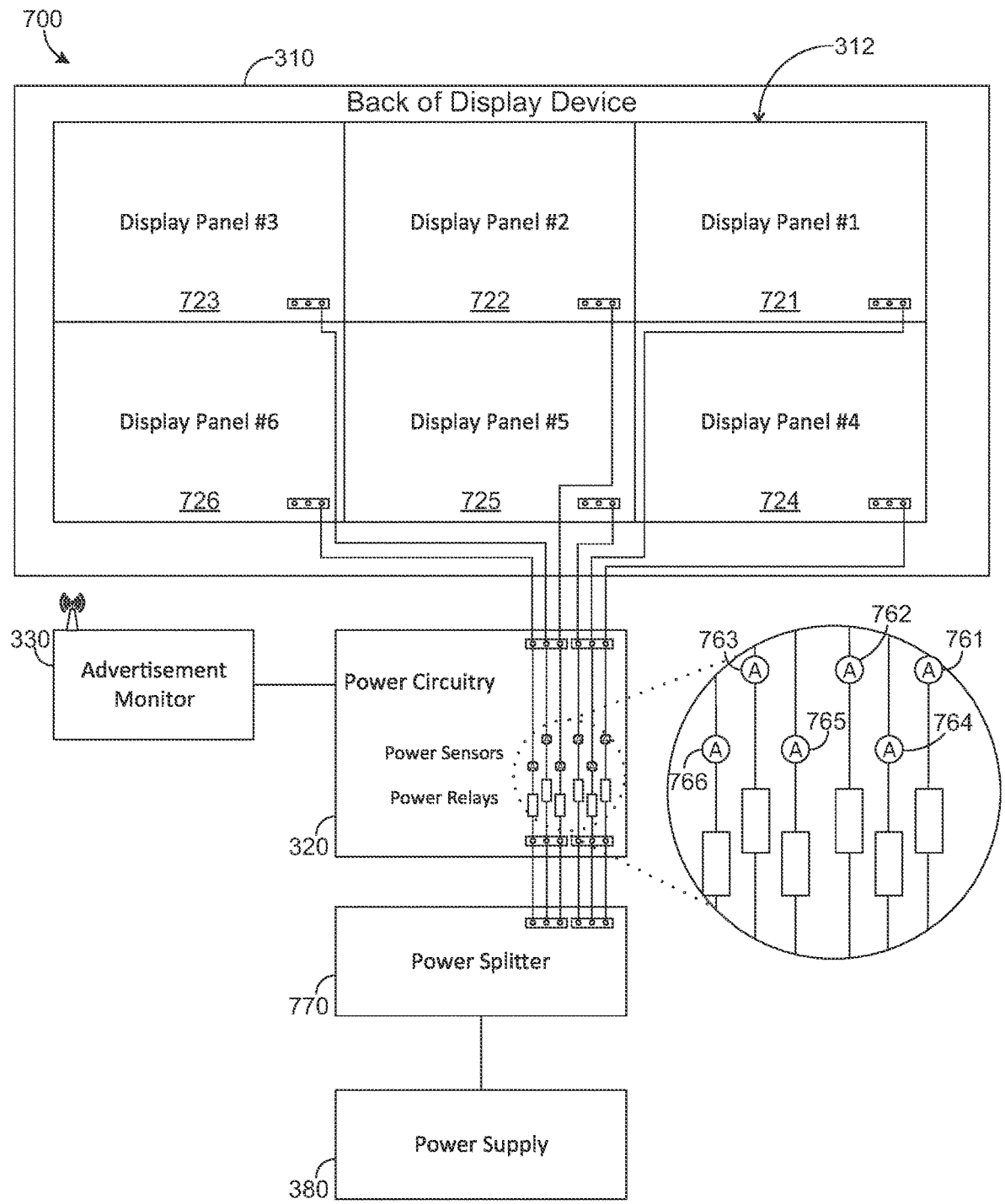
FIG. 7 is a diagram illustrating a portion of an exemplary embodiment of an advertisement monitoring system similar to FIG. 3 with alternative components for display devices composed of multiple display panels.

Some display devices 310 have display screens that are made up of multiple smaller display panels. As shown by FIG. 7, an advertisement monitoring system 700 may include a display device 310 made up of six display panels 721-726 (though any number of display panels may be used in other embodiments). In this example, the six different display panels 721-726 are each powered separately. Power from the power supply 380 for the panels 721-726 may pass through a power splitter 770 before passing through the power circuitry 320, which includes one or more power sensors (761-766, ideally one for each display panel 721-726) and optionally other equipment such as power switches or power conditioning circuits. The power sensors 761-766 measure the power consumption and fluctuations of each display panel 721-726 respectively and communicate data indicative of the measured power to the advertisement monitor 330. By detecting the power consumption of multiple display panels, a richer power signature may be generated for a particular advertisement. While FIG. 7 shows metering and powering of the display panels in parallel, other configurations are possible including daisy changing and so forth.

Note that, while FIG. 7 shows the advertisement monitor 330 being separate from the power circuitry 320, these components can be in the same housing or device. The power splitter 770 may also be integrated with the power circuitry 320. The power for the display panels may be alternating current (AC) or direct current (DC), and different sensing methods may be used in detecting the power consumption, such as current detection or DC metering or other known methods.

Figure 8A:
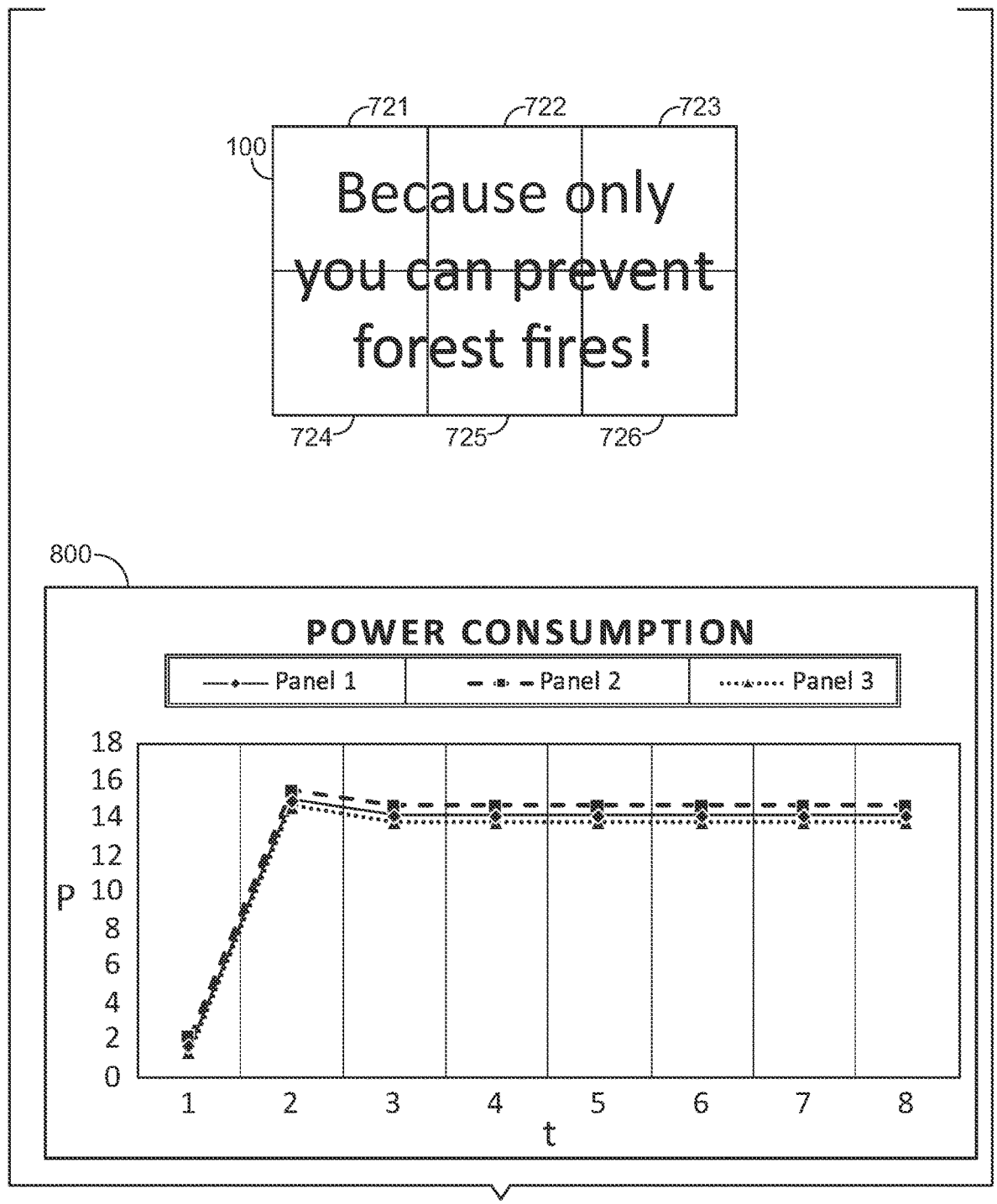
FIG. 8a illustrates an exemplary power consumption of a display device for the advertisement of FIG. 1a using the alternative components of FIG. 7.
Figure 8B:
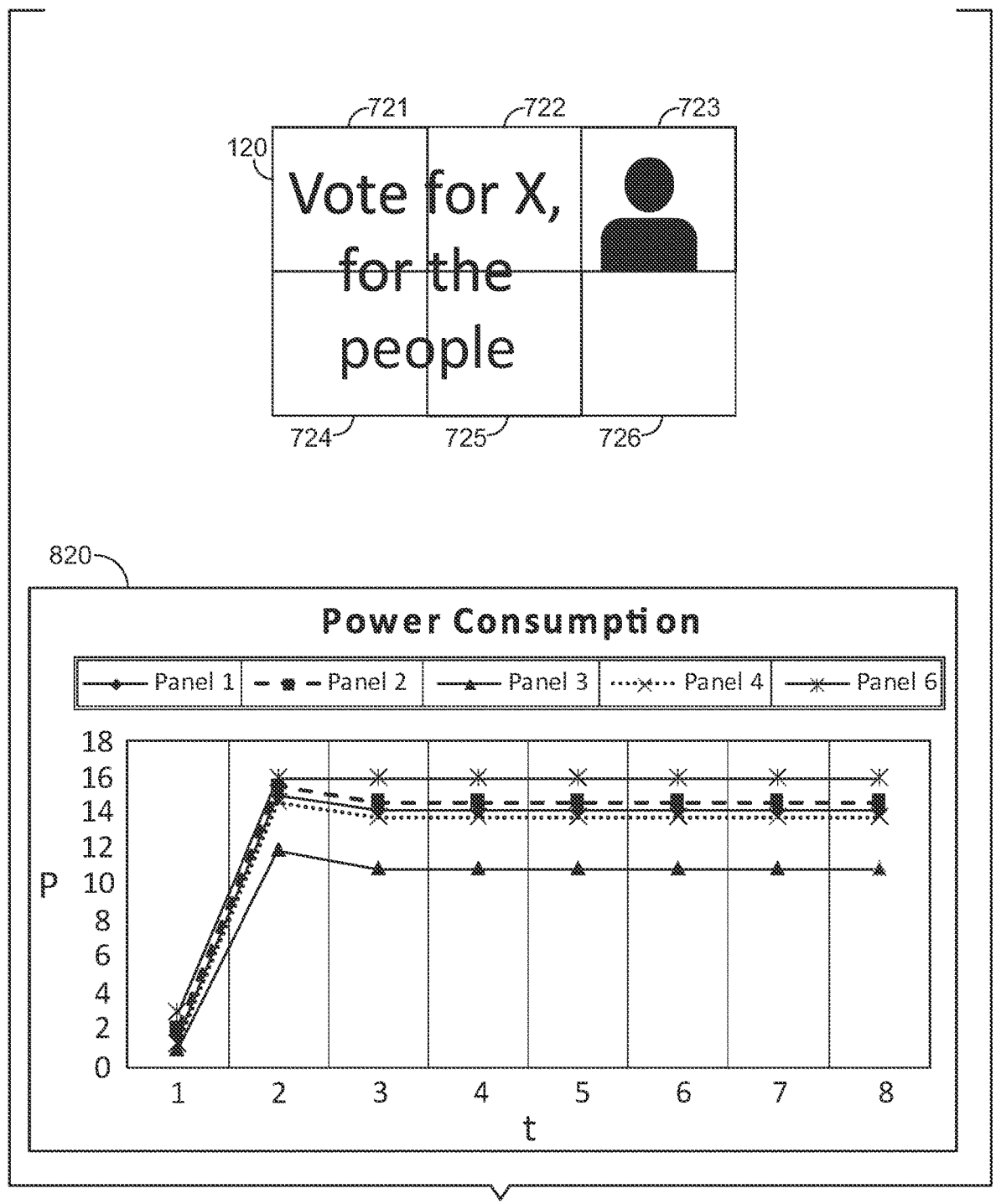
FIG. 8b illustrates an exemplary power consumption of a display device for the advertisement of FIG. 1c using the alternative components of FIG. 7.
Figure 9:
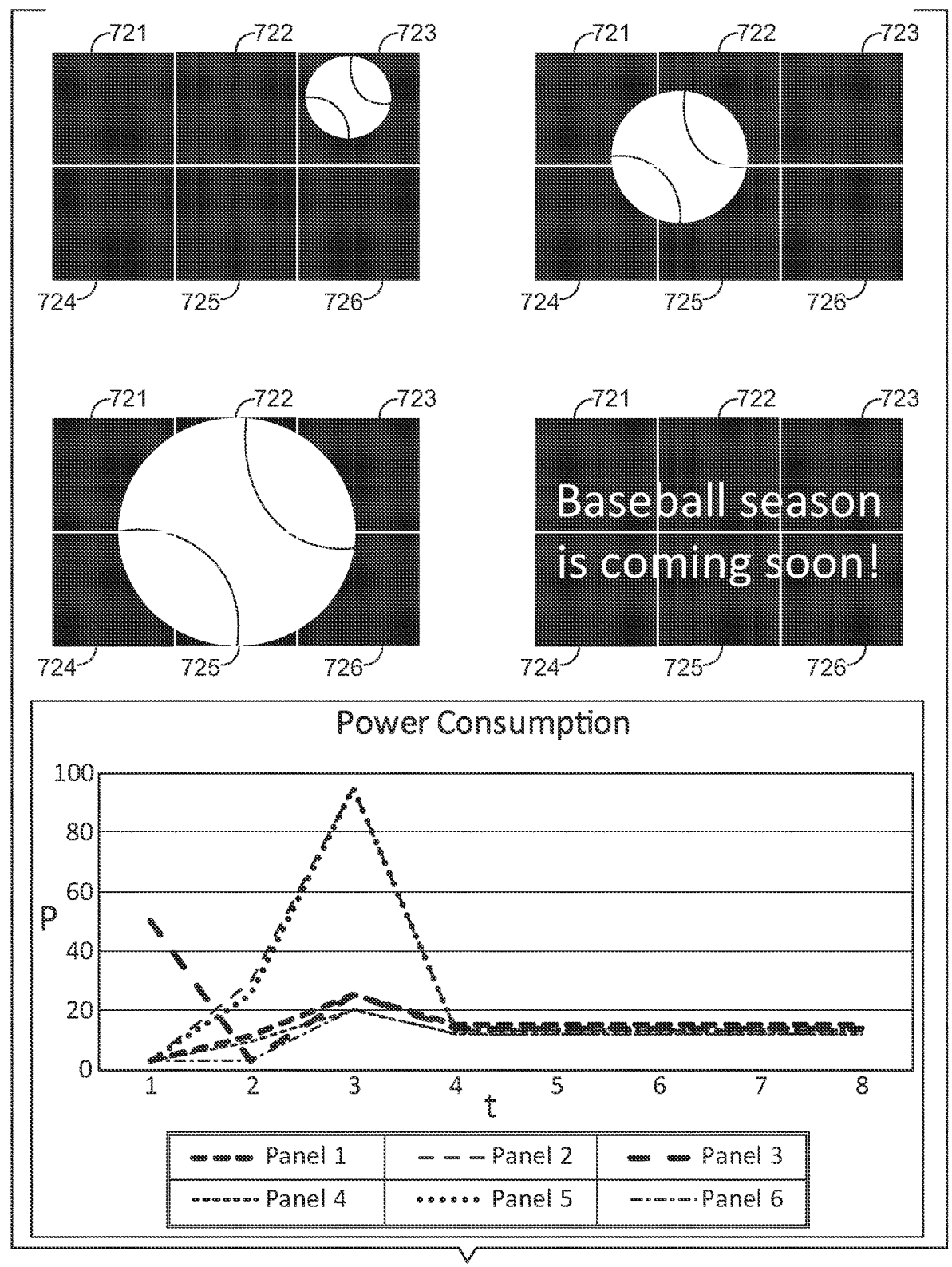
FIG. 9 illustrates varying power consumptions of a display device for an animated advertisement using the alternative components of FIG. 7.

The additional data collected by measuring the separate panels would make differences between different advertisements more apparent, thereby facilitating identification of advertisement signatures. In this regard, the measured power consumption profiles of the whole display for advertisements 100 and 120 might be relatively similar, as shown by FIGS. 4a and 4c. However, when measuring the subdivided panels, the differences between the power consumption profiles for advertisements 100 and 120 may become more pronounced. As an example, FIGS. 8a and 8b show subdivided versions of advertisement 100 and 120. The power consumption 800 for advertisement 100 due to its relatively average distribution of content across the 6 panels is relatively the uniform. However, the power consumption 820 for advertisement 120 has two significant outliers relative to "display panel 3" 723 and "display panel 6" 726 due to the image and blank (all white) area used. Thus, analyzing the different panels 721-726 separately may facilitate the process of distinguishing advertisements with otherwise similar overall power consumptions. FIG. 9 shows the subdivided power consumption for the animation of advertisement depicted by FIGS. 2a-d. As shown in FIG. 9, the power consumption during the first part of the animation varies significantly between the different panels. Hence the ability to measure each separate display panel can provide a richer data set from which to identify the displayed advertisement.

In some embodiments, the advertisement monitor 330 can be provided an expected schedule of advertisements to help it identify the advertisements being displayed. In such embodiments, edge detection and repeating patterns can help synchronize the expected schedule to the observed power consumption.

In some embodiments, the advertisement monitor 330 does not have access to data indicative of what should be displayed or the schedule of which advertisements are to be shown. In such cases, the advertisement monitor 330 can use edge detection or track other changes over time to help identify different advertisements. With static advertisements (advertisements which do not change over time), the power consumption should remain substantially constant over time. When power consumption remains constant over time, the system may determine the same advertisement has been displayed over that period of time. In examples where a display device 310 switches between multiple static advertisements on a periodic basis, a change in power consumption can be detected with a similar period. The system can determine the amount of time each static advertisement has been displayed by detecting periods of constant power consumption. FIG. 5a illustrates what such power consumption may look like for a display device 310 switching periodically between two advertisements 100 and 120 respectively. FIG. 5b illustrates what such power consumption may look like for a display device 310 switching between three advertisements 100, 110, and 120 respectively.

The addition of special patterns or transitions might be placed in between advertisements to help the system detect a change between advertisements. These transitions might only indicate a change of advertisement or might also help identify the previous or next advertisement. For example, a short transition to black is a common transition between images. The advertisement monitor 330 might detect the power consumption drop to within a threshold of zero for a threshold period of time and use that as an indicator or a hint that that one advertisement has ended and another one is about to begin. A longer threshold period of low or near zero power consumption may indicate a problem with the advertisement panel and may trigger an alert. A transition to all white could be a similar indicator of advertisement transition. A color or intensity changing transition that is either pleasing to see, too subtle to notice, or too quick to notice might also be used to transition between advertisements. Such transition may also be encoded to indicate information regarding the previous advertisement, the next advertisement, or both the previous and next advertisements. As an example, such information may include an advertisement identification number, advertisement count, etc. For example fading to black could be used between one set of advertisements, fading to white between another set of advertisements, a sloping transition fading to black and then white between a third set of advertisements, and a sloping transition fading white and then black between a fourth set of advertisements. Such transitions might always be placed between their perspective sets of advertisements and thereby indicate which advertisements came directly before or after the transition. Alternatively the transition might always be placed before or after specific advertisements and thereby indicate the next or previous advertisement respectively.

Monitoring individual display panels not only allows for the production of richer power signatures, it also may allow the system to detect issues or problems with individual display panels, as well as the display content in general. Certain patterns in a power signature may indicate the physical health of the display device (e.g., too much or too little power being consumed) and other patterns may be indicative of the content being displayed. Alarms may be issued if the system detects abnormalities in the content or operation of the display device. While FIG. 7 only displays the monitoring of the power supply as inputs to the advertisement monitor 330, monitoring the control lines or the data of the display device 310 is also possible (not shown).

Different display panels may consume different amounts of power to display the same advertisement due to differences in screen size and display technology. These differences can make it difficult to match power consumption signatures of advertisements from one display panel to another. These differences can be mitigated by normalizing the data before comparing it to the signatures. As an example, the measured power consumption values may be linearly normalized applying the following formula:

$$\frac{\text{Consumption}_{Measured} - \text{Consumption}_{Minimum}}{\text{Consumption}_{Maximum} - \text{Consumption}_{Minimum}}$$

where $\text{Consumption}_{Measured}$ is the power consumption measured, $\text{Consumption}_{Minimum}$ is a display's minimum normal operational power consumption level, and $\text{Consumption}_{Maximum}$ is a display's maximum normal operational power consumption level.

Power consumption signatures can be created for the advertisements by displaying the advertisements on the display device 310 and detecting the power consumed over time. Each detected power consumption signature associated with an advertisement can be stored by the advertisement monitor 330 for use during operation to identify the associated advertisement. Once these advertisement signatures are produced and stored by the advertisement monitor 330, future power consumption signatures can be compared to these signatures to determine if a display device 310 is properly displaying the advertisements.

It takes time and effort to display advertisements on specific or various display devices to generate advertisement signatures each time a new advertisement is used. This effort is greater when the display devices 310 may be located in distant or hard to reach places. To save such time and effort, it would be helpful to have a method to estimate or calculate what the power consumption signature should look like for a particular advertisement based on the advertisement itself and possibly with information regarding the power consumption characteristics of a particular display.

Figure 10:
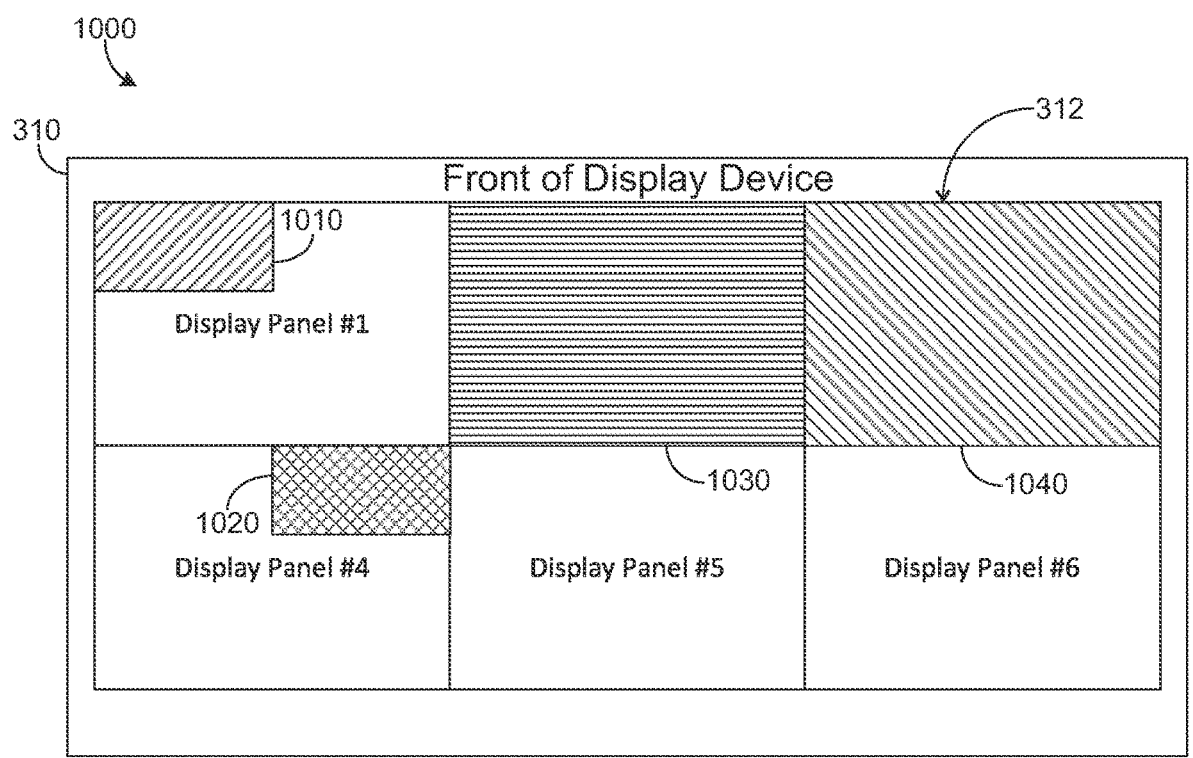
FIG. 10 illustrates a display device, such as is depicted by FIG. 3, during a calibration process.

The power consumption characteristics of a display device 310 can be determined by displaying known advertisements on the display device 310 and comparing the power consumption signatures generated to known advertisements generated by similar displays. But the color ranges and intensity ranges of a series of known advertisement might not give the system a full range of a display device's full capabilities and hence the display device's full power consumption characteristics. To get a fuller understanding of a display device's power consumption characteristics, a special series of configurations or calibration images or animations could be used to record a fuller device power consumption information. For instance, FIG. 10 shows exemplary configuration or calibration images which may be displayed by a display device 310 while performing a power consumption characteristics scan. Different colors, one at a time, may be displayed on portions of a display device 310 (for example a two-by-two inch block, a one-by-one foot block, or other size) while at least one power sensor detects the power consumption. These blocks may expand to fill the display panel while the advertisement monitor 330 measures the power consumption and how such consumption changes. This process may be repeated with other colors. Another phase or a separate alternative embodiment of a power consumption characteristics scan may include an individual display panel, the whole screen or some other subdivisions displaying one color or another or while other areas are left off or without color (e.g. transitioning the whole screen from minimum to maximum intensity for the devices primary colors red, green, blue, and white respectively).

One panel of the display device 310 may be tested at a time or multiple panels simultaneously. As an example a red may be displayed in a small subsection of a display panel 1010, blue 1020 in another display panel, while green 1030 fills a third display panel, and combinations of the colors e.g. yellow or purple 1040 may fill another panel. These patterns may move from screen to screen while the calibration takes place.

Color pixels are generally made by the use and blending of three primary colors, red, green, and blue. By testing different colors on the full screen and different sizes, the system can create a color palette/power compensation model for the particular device and use the model to calculate the expected power signatures for each particular advertisement to be displayed on that device. This might work by running the whole device 310 at along the spectrum of intensity for each of the colors white, red, green, and blue from minimum values to maximum while recording the power consumed. In the case of multiple panels the system might test each display panel 761-766 then test them all simultaneously. As generally each color would be a combination of red, green, and blue, these data sets would allow the system to estimate the power consumed by any particular color. Testing white would help determine if the combination of colors power consumption has a linear correlation.

If the power consumption has a linear relationship with respect to intensity of the color displayed, then device characteristics could be expressed as a linear equation of each primary color. If the power consumption is not linear with respect to the intensity of each color, then a table of power consumed for each color intensity can be generated. With this data collected and the number of pixels in the display known, a power consumption for any particular advertisement can estimated by analyzing an advertisement image to determine the red, green, and blue intensity value for each pixel; calculating the power consumption of each intensity value using either the formulas described above or looking up the intensity score in the aforementioned table; and summing the estimated per pixel intensity power consumption value of each primary color of each pixel of the proposed advertisement to predict the power consumed for display of the respective advertisement image.

During this power consumption characteristics scan, the system can record other useful power consumption details including, for example, the normal maximum and minimum operational power consumption for the device by recording the power consumption of the display device 310 while it is displaying a full intensity white, full intensity of other colors, and a black screen. These measurements can be used for power signature normalization as described earlier. Additionally, if the system later detects the display device 310 is consuming significantly more than the normal maximum operational power consumption, it may be indicative of a hardware short. If the display device 310 is consuming significantly less than the normal minimum operational power consumption, it may be indicative of the display device 310 is off or has failed. The system 300 may be configured to send alerts or power cycle the display device 310 if such problems are detected in an effort to restore normal functionality to the display device 310.

The power consumption of a display panel may change based on different parameters. For example, temperature might affect how much energy electronics consume. Additionally, the brightness of a display device 310 may be configured to change based on the amount of ambient light present which in turn would affect the amount of power consumed while displaying an advertisement. The power consumption characteristics scan may be run at different times to collect enough data to compensate for such changes. Especially in outdoor displays, weather reports, extra sensors on the advertisement monitor 330, or information from the content controller 370 or the display device 310 may collect information used to help the advertisement monitor 330 to compensate for such variations. As an example, the advertisement monitor 330 may apply a conversion factor to the power consumption signatures collected, compare the collected power signatures to advertisement signatures collected during similar circumstances, or vary the thresholds based on the collected information when comparing a power consumption signature to an advertisement signature for determining matches.

To identify and verify that an advertisement is being properly displayed, detected power consumption signatures can be matched to advertisement signatures. Matching power consumption signatures to advertisement signatures may occur in various ways. As an example, first, the power consumption signatures can be identified and may be normalized as discussed above. Second, the detected power consumption signature can be compared against a list of available or expected advertisement signatures. Thresholds may be used to account for slight variations between the advertisement power consumption signatures and the measured power consumption signatures. In the case of static advertisements, this could be as simple as matching the measured power consumption against an expected power consumption. If no match is found for the measured power consumption signatures among the expected advertisement power signatures, an alert can be sent to the advertiser, sign operator, or other relevant contacts. If multiple matches are found, disambiguation may be performed.

In the case of power consumption signatures created by monitoring multiple display panels, it may be more efficient to search the single panel advertisement signatures first and then, if there are multiple hits, use the individual panel power consumption signatures individually to disambiguate between the multiple hits. This can be done by summing the individual display panel power signatures and normalizing the results. This summed signature is compared to the advertisement signatures as described above. If no match is found, an alert may be generated as described above. If a match is found then the advertisement can be logged. If multiple matches are found then a disambiguation step may be desirable.

Disambiguating search results can be performed in a number of ways. In the case where multiple display panels of a display have been measured, disambiguation can be performed by comparing the individual panel power consumption signatures against the advertisement signatures of individual panels. In the case that the advertisement monitor has an advertisement display schedule, comparing the history of identified advertisements against the schedule and history of advertisements for the particular display can be used to disambiguate the results (e.g. if a set number of advertisements are displayed in a particular order and one of the multiple advertisement signatures that matches the measured power consumption signature belongs to the expected. Another method may use special or encoded transitions to identify or disambiguate advertisements. An alternative verification method might start with an advertisement display schedule and might check if the displayed advertisement's power consumption signature matches that of the scheduled advertisement. Both matches and failures are logged for reporting in the associated advertisement campaign of error logs.

Depending on the display technology used, the power consumed for different display images may vary dramatically. For example an LCD based display often uses the same backlight for every pixel in a display panel, and the individual pixels only control how much of which spectrums of light are allowed through. Hence, the variation in power consumption for different colors and intensities of LCD based displays would be offset by the power drawn by the backlight, and there might be much smaller variations in power consumed relative to LED based display technologies. Such an offset could be calculated and mathematically removed as part of the normalization of the power consumption. As an example, for a given power value measured by the system, the contribution of power consumed by the backlight (which is likely to be constant) may be subtracted from the measured power value. Additionally, depending on the technology used and its implementation, the power consumed by switching from one image to another may generate identifiable changes in the power consumption of the display device 310.

Figure 11:
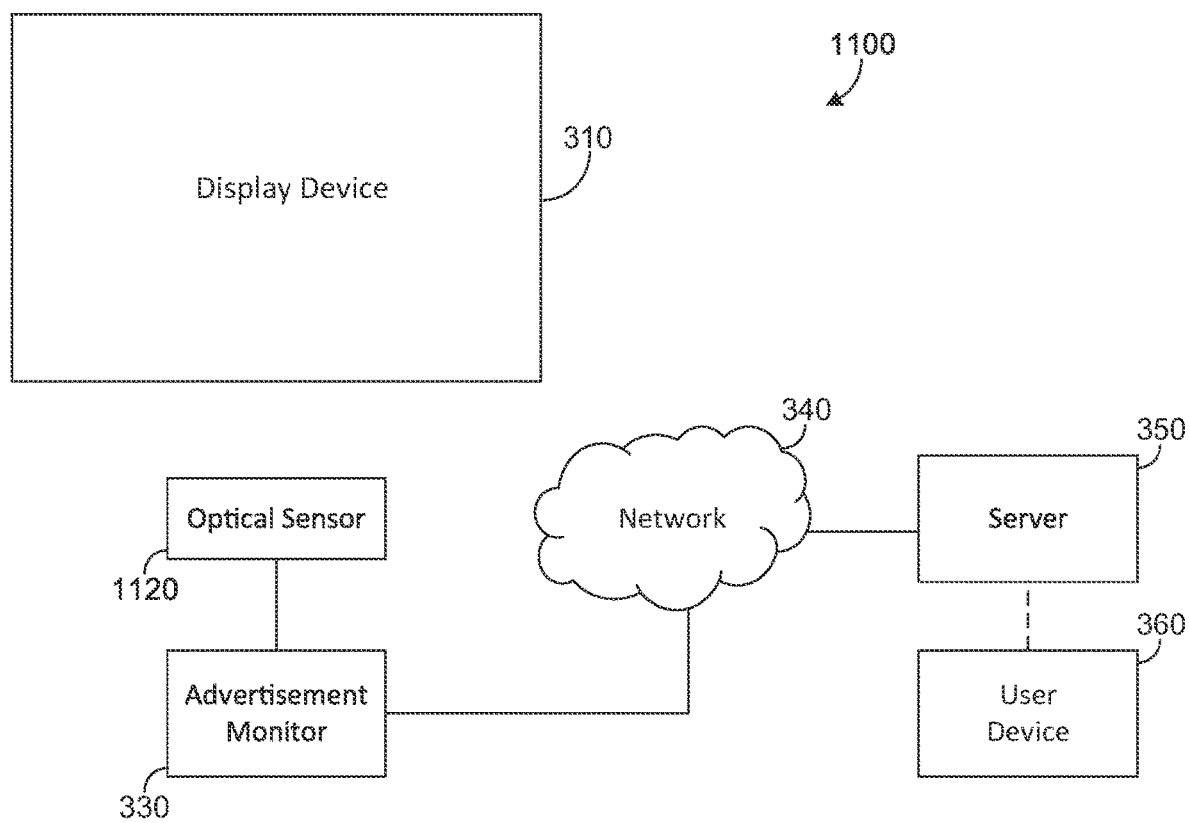
FIG. 11 is a block diagram illustrating an exemplary embodiment of a system for monitoring advertisements using one or more optical sensors.

Some display technologies or particular installations may be less suited to the verifying of display system health and content integrity based on power consumption signature detection. In such situations optical detection, if permitted, might be better suited for use with an advertisement monitor 330. FIG. 11 depicts an exemplary embodiment of an advertisement monitoring system 1100 using one or more optical sensors 1120. As shown by FIG. 11, the system 1100 comprises an electronic display device 310, with at least one optical sensor 1120 arranged in such a way to monitor the display device 310, such as on the display's frame or on the display's screen itself. In the embodiment shown by FIG. 11, an optical sensor 1120 is coupled to an advertisement monitor 330 for the collection of sensor data associated with the display device 310. The optical sensor 1120 may include a camera of a suitable resolution or field of view for the private or secure environment in which the optical sensor 1120 is positioned.

As an example, the optical sensor 1120 may include a camera of relatively low resolution positioned with a field of view only encompassing the display device 310 or a portion of the display device 310. By limiting the field of view so that the sensor 1120 is able to collect data only on display device 310 and specifically is unable to optically collect data on the surrounding environment, concerns about the use of an optical sensor 1120 in a secure or private environment may be mitigated. Alternatively, the optical sensor 1120 may be implemented with any of a variety of different sensors depending on what is suitable or desirable for the environment, including but not limited to one or more barcode readers, incident light readers, spot light readers, photodetectors, pyrometers, photovoltaic sensors, etc. These sensors may return information about the whole screen or only a portion thereof. The portion may be as small as a pixel or a group of pixels, such as small group of pixels near a corner or edge of the display screen. Different verification methods can be employed depending on the type of sensor used and the sensor locations, as discussed below with the following examples.

Figure 12:
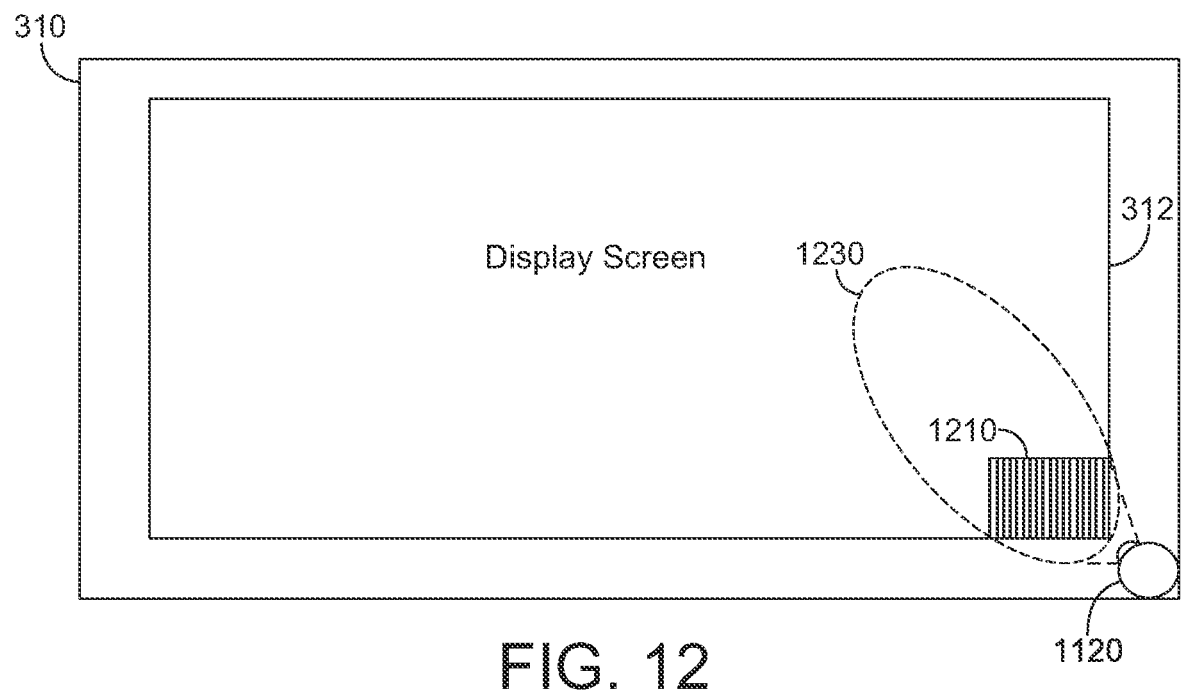
FIG. 12 illustrates a display device with a single-corner based frame sensor.

FIG. 12 displays an exemplary display device 310 with an optical sensor 1120. In this example, the optical sensor 1120 is placed in or near a corner of the display device 310. The sensor 1120 may be coupled to the display device 310 or another apparatus that holds the sensor 1120 in the position shown relative to the display device 310. The field of view of the sensor may include only a small region of the display device 310, such as the region 1230 marked by dotted lines in FIG. 12, or optionally the field of view might include the whole display screen. Even if the field of view only contains a small region 1230 of the display device 310, an assumption can be made that, if the small region 1230 is operational and properly displaying the advertisement, the advertisement as a whole is being properly displayed. While it is possible that other regions of the display device 310 are not operating properly when the region 1230 in view of the sensor 1120 is operating properly, there are many errors that could be detected using these techniques.

In this regard, many operational errors, when they occur, affect the entire display device 310 such that these types of errors would be detected when the sensor 1120 is monitoring only a portion of the display device 310. Further, by configuring the sensor 1120 to view only a small region 1230, concerns about the private or secure nature of the environment may be mitigated.

As an example, since only a small region 1230 is being monitored, the sensor 1120 may be small and may be positioned close to the display device 310, such as within a few inches or even less than an inch. In some cases, the sensor 1120 may contact the display screen 312 such that the sensor 1120 only has a view of the pixels within a small region of the display screen 312, such as the region contacting the sensor 1120. In such embodiments, the sensor 1120 may be configured to monitor only a small number of pixels. Further, the presence of the sensor 1120 may be hardly noticeable, and even if noticed, it may be readily apparent to an observer that the sensor's field of view is limited to the display device 310 and specifically does not include the surrounding environment. Moreover, configuring the sensor 1120 to monitor only a portion of the display screen 312 allows at least some monitoring and verification of operation to occur while at the same time alleviating fears that the sensor 1120 may be used to collect information on the surrounding environment.

Note that various processes may be used to determine if the display device 310 and other display system hardware are functioning properly and displaying the proper advertisement depending on the type of sensors being used and the sensor arrangements. For example, if the sensor 1120 is a camera that is positioned close to the display device 310, such as within a few inches or less, the captured image may be distorted. The advertisement monitor 330 may be configured to adjust the pixel values in order to compensate for the distortion and then compare the compensated image to the corresponding portion of the image of the advertisement being displayed at the time of capture. If the compared portions sufficiently match within a desired margin of error, the monitor 330 may confirm that the display device 310 is functioning properly and is displaying the correct advertisement. However, if the compared images do not match, the monitor 330 may generate an alert for notifying a user of the detected anomaly. In some embodiments, the alert could include the portion of the image that has been captured.

Some types of sensors might be configured to detect only limited types of information about the display device 310 in an effort to alleviate concerns about the use of the sensor 1120 to collect information about the surrounding environment. As an example, a sensor 1120 may be configured to sense an average color or intensity of light within the field of view of the sensor 1120. When the sensor 1120 is configured to measure light wavelength and detect intensity or color, such as an average intensity or color of light within its field of view, the advertisement monitor 330 can compare the measured wavelength and/or the measured intensity or color value from the sensor 1120 to an expected wavelength and/or an expected intensity or color value from the advertisement being displayed to determine if they sufficiently match over time, similar to comparisons of power values in embodiments described above for monitoring power consumption. That is, the expected wavelength and/or expected color or intensity to be sensed over time for an advertisement may be used as a signature that is compared to the actual measurements of wavelength or actual measurements of color or intensity to determine if the advertisement is being properly displayed. In some embodiments, wavelength, color, and intensity may be used as parameters to define a signature.

Additionally, as with the power signatures discussed above, time may be a factor in the optical signatures, such as if the advertisement includes animation which might cause an identifiable variation for the sensor. Hence, transitions of color or intensity over time can form a signature which can be used to confirm whether a specific advertisement corresponding to the signature is being properly displayed.

As described above, in some embodiments, the region 1230 in the sensor's field of view may be small in an effort to alleviate concerns about the sensor's use within a private or secure environment. Monitoring only a small region 1230 may make it more difficult to identify a given advertisement relative to an embodiment that monitors a larger region, such as the entire display screen 312. In some embodiments, various techniques for facilitating identification of advertisements may be used.

As an example, the displayed advertisement may include or may be modified to include within the field of view 1230 graphical content 1210 (referred to herein for simplicity of illustration as "special content"), such as a special character, pixel, letter, or barcode. The special content 1210 might be encoded with data or the special content's presence may simply signify the identity of the presently shown advertisement. The special content may be encoded in real-time by the advertisement monitor 330 prior to delivery of the content to the display device 310. That is, for a given image frame from the content controller 370, the advertisement monitor 330 may replace a portion of the frame within the field of view of the sensor 1120 with special content to be sensed by the sensor 1120. Specifically, the advertisement monitor 330 may replace the pixel values defining this portion of the image frame with new pixel values defining the special content. Thus, in such an embodiment, the advertisement monitor 330 inserts the special content into a portion of the image frame within the field of view of the sensor by changing the pixel values of such portion to new pixel values defining the special content. Note that portion of the frame buffer 1821 corresponding to the field of view of the sensor 1120 may be identified or otherwise determined from a calibration process for determining which pixels are in within the field of view of the sensor 1120, as described further herein. Alternatively, the special content may be encoded and embedded during the preparation of the advertisement image and/or video so that no onsite processing by the advertisement monitor 330 to include the special content is necessary.

Notably, the special content might be selected to be compatible with the optical sensors in use by the particular advertisement monitor, e.g. a barcode for a barcode reading sensor. The special content may be unique for the advertisement (e.g., a "watermark") so that it may be used to identify the advertisement. This identification can be performed many ways including by comparing it to a list of optical signatures of the advertisements or advertising determinants (AD). As an example, the special content might use specific colors or patterns, change color, pulsate, oscillate, or otherwise change to transmit information to the optical sensor. The special content may include a barcode that is unique to the advertisement, thereby defining an advertisement determinant for use in identifying the advertisement. The advertisement monitor 330 may be configured to compare the advertisement determinant or other type of signature sensed by the sensor 1120 to predefined information about the advertisement scheduled to be displayed to confirm that the correct advertisement is in fact being displayed at the appropriate time, as will be described in more detail below. If the special content includes one or more numbers or letters, the advertisement monitor 330 may use optical character recognition (OCR) techniques to interpret the numbers or letters. The special content may be displayed during an advertisement or during the transition between advertisements or both. In some embodiments, the special content may be small and in a position, such as near a corner or border, to distract as little as possible from the viewer perception of the advertisement. In some embodiments, the special content may be displayed only briefly. As an example, the display of the special content may be sufficiently short such that it is not detectable by a human.

In some embodiments, the advertisement monitor 330 may store a predefined schedule of advertisements. Each advertisement in the schedule may be correlated with a predefined signature that should match the signature (e.g., power pattern, intensity pattern, color pattern, barcode, or any other signature described above) sensed by the sensor 1120 when the advertisement is displayed. During operation, the monitor 330 may compare the sensed signature to one or more of the predefined signature to identify which advertisement is being displayed. Further, the monitor 330 may track the time that the advertisement is displayed, such as by measuring the time between the identification of one advertisement to the time to identification of the next advertisements. Using this information, the monitor 330 may confirm whether the correct advertisements are being displayed at the appropriate times or rates.

Note that, in detecting the advertisement signature (e.g., special content), the monitor 330 may be configured to have to compensate for ambient light changes such as for time of day and weather. Additionally special patterns or transitions might be placed in between advertisements to help the monitor 330 to detect a change between advertisements. These transitions might only indicate a change of advertisement or might also help identify the previous or next advertisement as discussed earlier.

Figure 13:
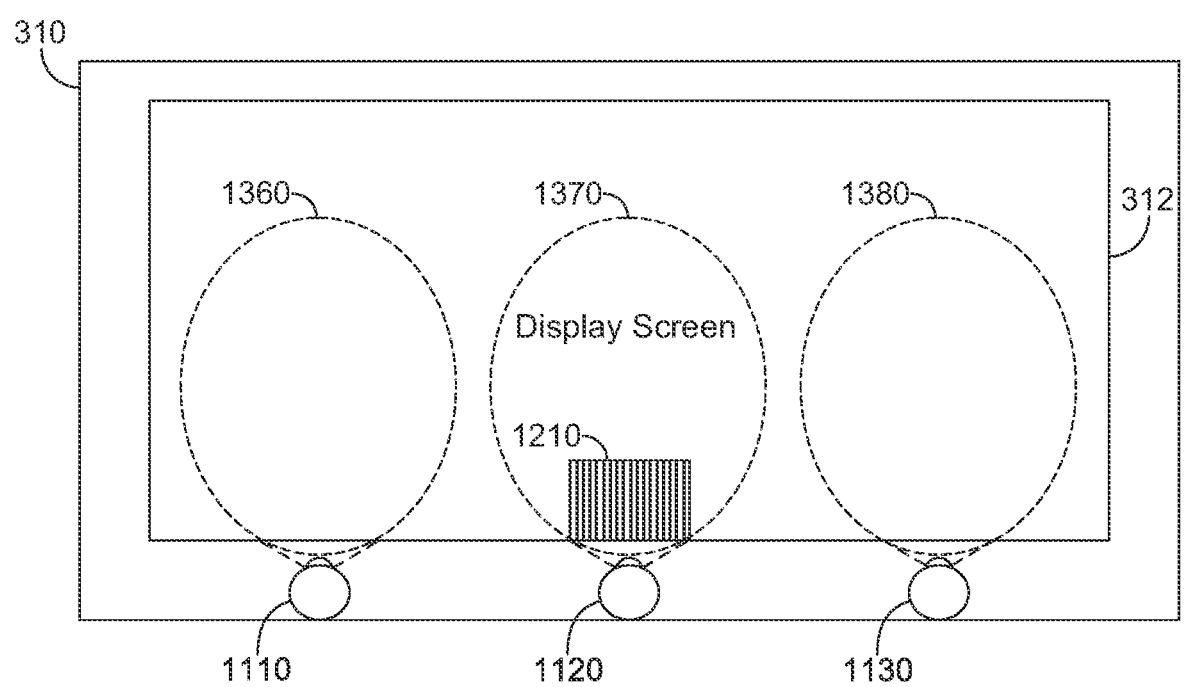
FIG. 13 illustrates a display device with an array of frame-based sensors.

FIG. 13 illustrates a display device 310 with an array of optical sensors 1110, 1120, 1130 arranged along the bottom of the frame of the display device 310 to detect multiple regions (1360, 1370, 1380) respectively. In this regard, region 1360 is within the field of view of sensor 1120, region 1370 is within the field of view of sensor 1120, and region 1380 is within the field of view of sensor 1130. In other examples, any of the regions 1360, 1370, 1380 may overlap. Collectively such regions 1360, 1370, 1380 could cover the whole of the display screen. These sensors 1110, 1120, 1130 may be the same type (e.g. an array of cameras) as each other or they may be different types of sensors. For example, in FIG. 13, one of the sensors 1120 might be a barcode reader situated to read special content on the display device 310 that might include a barcode 1210 or other special content used to identify the advertisement. The other sensors 1110, 1130 may be configured to sense color or intensity patterns, as described above, to be used in identifying the advertisement being displayed or verifying that the advertisement is being correctly displayed.

Special content can be placed anywhere within the field of view that it might be properly detected by a compatible sensor. A larger collective field of view gives the system greater flexibility as to where to place the special content so as not to interfere with the content of the advertisement. Other details regarding the special content has been discussed in more depth previously. The use of an array of sensors 1110, 1120, 1130 would allow for the collection of a greater/richer amount of data and would make the advertisement's optical signature richer. The use of multiple sensors 1110, 1120, 1130 also allows the system to stitch together a larger portion of the advertisement for verification and identification purposes. While in the embodiment depicted by FIG. 13 one array of sensors is shown placed across the bottom of the display, arrays might be placed along any edge, at any corner, or some combination thereof.

Figure 14:
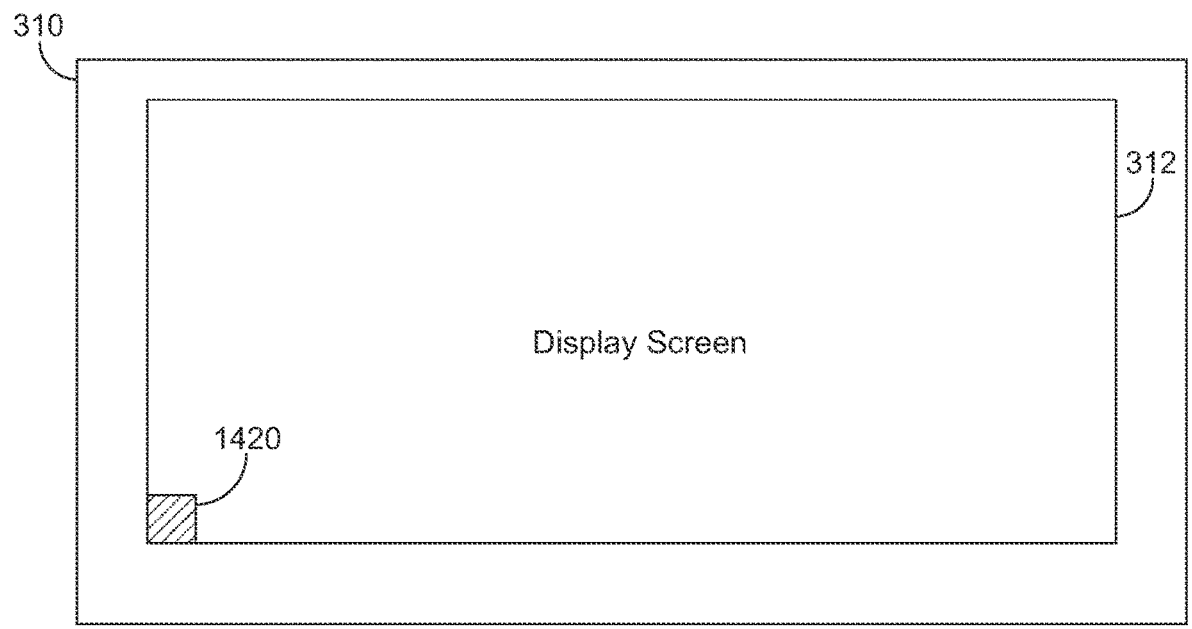
FIG. 14 illustrates a display device with an on-screen optical sensor.

FIG. 14 depicts a display device 310 with an on-screen optical sensor 1120. In this example, the optical sensor 1120 is affixed to the surface of the display device 310. On-screen optical sensors 1120 may be opaque or translucent. A display device 310 might have one on-screen optical sensor 1120 in a discreet area such as on or near the corner (see FIG. 14) or other edge of the display device 310. Alternatively an array of on-screen optical sensors 1120 may be placed along an edge or at multiple corners. Opaque sensors may be relatively small and placed so as not to overly obstruct the user's view of an advertisement. An opaque sensor 1120 may hide from viewers and special content displayed within the field of view of the sensor 1120, and such an opaque sensor 1120 may be especially suited for use with the aforementioned special content.

Figure 15:
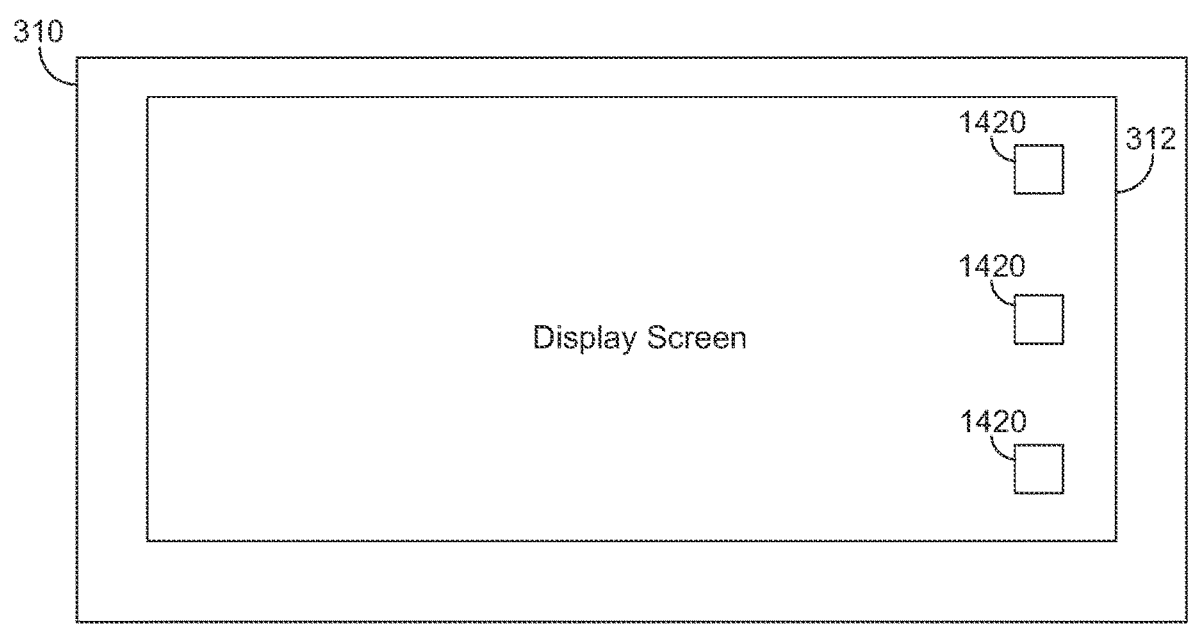
FIG. 15 illustrates a display device with an array of on-screen optical sensors.

FIG. 15 illustrates a display device 310 having an array of on-screen optical sensors 1120. In this example the optical sensors 1120 are affixed to the surface of the display device 310. The sensors 1120 may be substantially transparent. Such a display device 310 might have an array of sensors 1120 along an edge, at the corners, on each separate display panel (in the case of multiple display panels), or across an entire display. Since the sensors 1120 are transparent or at least largely transparent, they only have a slight, if any, effect on the appearance of the advisements and can be placed more freely around the display device 310.

Figure 16:
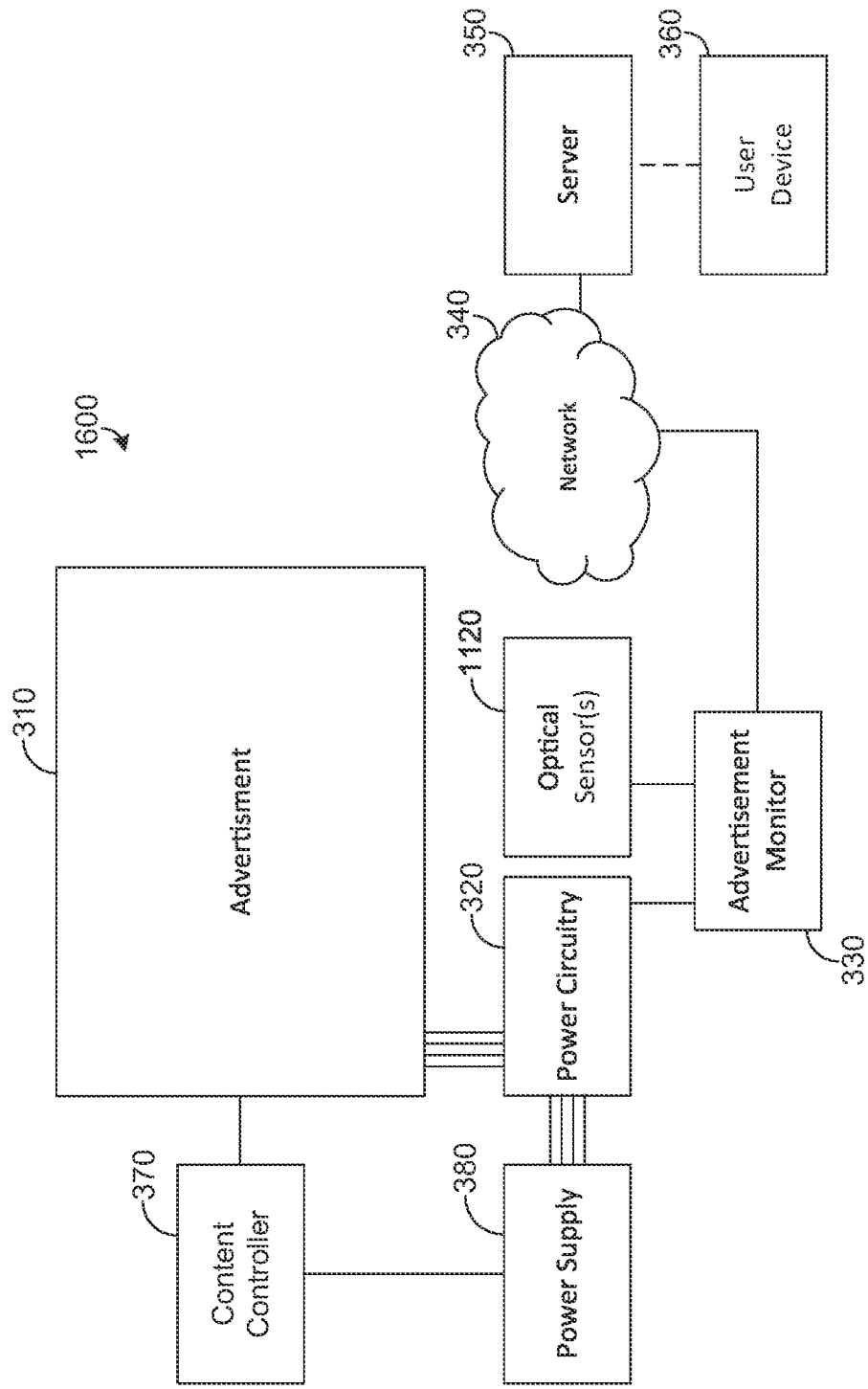
FIG. 16 is a block diagram illustrating an exemplary embodiment of a system for monitoring advertisements based on both detecting power consumption and using optical sensor(s).

FIG. 16 depicts an exemplary embodiment of an advertisement monitoring system 1600 that uses both power and optical monitoring. As shown by FIG. 16, the system 1600 comprises an electronic display device 310, with power circuitry 320 which may be coupled in series between the power supply 380 and the display device 310 or otherwise in a position to detect or meter the power consumed by the display device 310. Additionally one or more optical sensors 1120 are arranged in such a way to monitor the display device 310, such as on the display's frame or on the display's screen as discussed previously. The power circuitry 320 and optical sensor(s) 1120 are coupled to an advertisement monitor 330 for the collection of sensor data associated with the display device 310. The advertisement monitor 330 may communicate through a network 340 to a server 350. The advertisement monitor 330 may be configured to monitor the advertisements displayed by the display device 310 based on both power consumption and the displayed image according to the techniques described above.

Figure 17:
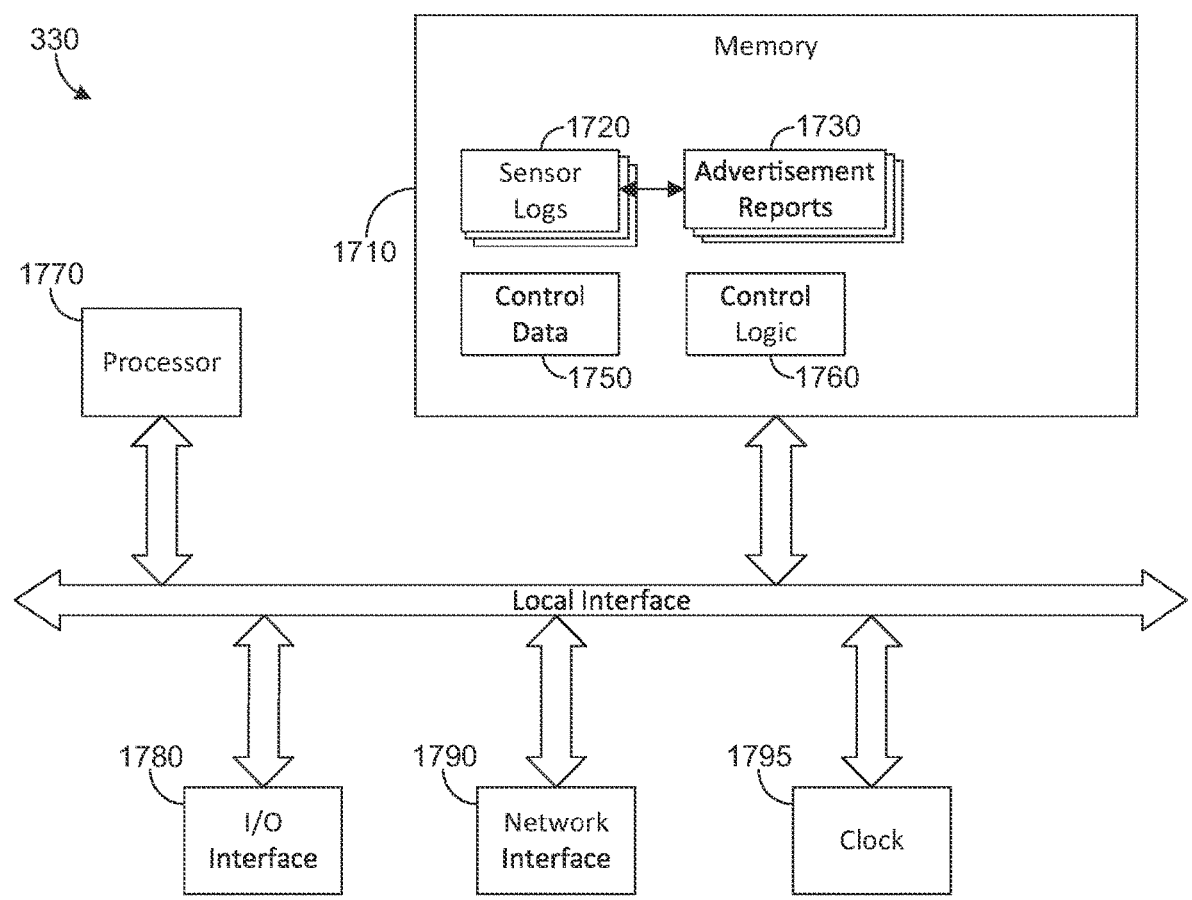
FIG. 17 is a block diagram illustrating an exemplary embodiment of an advertisement monitor.

FIG. 17 depicts an exemplary embodiment of an advertisement monitor 330. The advertisement monitor 330 has one or more processors 1770 for executing instructions stored in memory 1710. In the embodiment depicted by FIG. 17, the memory 1710 stores control data 1750 and control logic 1760, which when executed by the processor 1770 controls the operation of the monitor 330 based on the control data 1750 according to the techniques described herein. The memory 1710 also stores sensor data 1720 and advertisement reports 1730. Specifically, the control logic 1760 may include instructions that, when executed by the processor 1770, cause the processor 1770 to perform the functions described herein for the advertisement monitor 330. As an example, the processor 1770 may compare sensor data sensed by one or more sensors to predefined advertisement signatures stored within the control data 1750, and the processor 1770 stores the results of such comparisons in the advertisements reports 1730. Likewise, the processor 1770 may compare collected data from various display system hardware componentry in electrical connection with the advertisement monitor 330. Such collected data may be used by the processor 1770 to initiate certain actions (e.g., enabling/disabling power, etc.) in addition to storing results in the advertisement reports 1730. The control data 1750 may contain a shortened list of device specific advertisement signatures which are expected for advertisements to be displayed by the particular system 300.

Both power and optical signatures may be based on the collection of sensor data over time. To calculate and identify signatures, sensor data may be collected over time and then processed by related algorithms to identify the signatures and to compare them against stored advertisement signatures in the database. The results of such comparisons may be sent to the server. Logs indicative of advertisement matches might be stored in advertisement reports 1730.

Sensor data may be collected through the monitor's I/O interface 1780. The I/O interface 1780 includes ports that may be connected to external devices, such as the network interface 380, content controller 370, the display device 310, and/or the sensor 1120, for transmitting or receiving data to or from these external devices.

The advertisement monitor 330 may have the ability to power off or deactivate the display device 310 and/or other display system hardware components in the event the content of the advertisements or the integrity of the display device has been compromised. A system clock 1795 is available for adding time and date data to the sensor logs and advertisement logs. Log data may be sent to the server optionally indicating the times, dates, count, and duration that various advertisements have been displayed including advertisements IDs, and sequence IDs as appropriate. Log data may be erased after the server confirms receipt or may be kept and/or accumulated for a period of time for the improvement of power signatures or optical signatures or for backup purposes. Any required synchronization is performed to compensate for differences in optical and power data timing. The advertisement monitor 330 may also accept input from the content controller 370 for verification of intended advertisement display and optionally may modify the control signals to the display for the addition of special content if not already embedded in the advertisements.

In the embodiments described above, the advertisement monitor 330 is local with the display device 310 and communicates with a remote server 350. However, other configurations of the advertisement monitor 330 are possible. As an example, it is possible for the advertisement monitor 330 to be implemented at the server 350 and for data indicative of the sensed parameters, such as power consumption, temperature measurement or optical parameters, to be transmitted across network 340 to the advertisement monitor 330. It is also possible for portions of the advertisement monitor 330 to reside at the location of the display device 310 and for portions of the advertisement monitor 330 to reside at the server 350 or other location. As an example, a portion, referred to as "local portion," of the advertisement monitor 330 at the location of the content controller 370 and display device 310 may transmit to the server 350 frames of the video signal from the content controller 370 and sensor data from the sensor 1120. At the server 350, a portion of the advertisement monitor 330, referred to as "remote portion," may compare the frames from the advertisement 370 to the sensor data from the sensor 1120 to verify operation of the system. If errors are detected, instructions may be sent from the remote portion at the server 350 to the local portion at the location of the content controller 370 and the display device 310 for instructing the local portion to take one or more actions for addressing or mitigating the detected errors. Yet other configurations of the advertisement monitor 330 are possible in other embodiments.

In the various embodiments described herein, the advertisement monitoring system may automatically generate reports of advertisement display time, location, duration, and other conditions and send alerts if a display device 310 is experiencing integrity issues or other problems. Additionally these reports may indicate the type of monitoring on which the report is based and whether the data is based on partial or full screen monitoring. In the case of partial screen monitoring, the report may also indicate what percentage of the display device 310 is monitored. The reports may contain the sensor data or summaries thereof. Alerts sent to the server regarding unidentified content, temperature, optical or power consumption outside normal parameters may include copies of the processed or raw sensor data. The server or other component of the system may bring this to an operator's attention through emails, SMS messages, text messages, popup windows, or other methods. Reports may be broken down by advertising campaign, billboard, or geographic region and may include contact information for maintenance or service teams. Additionally reports may provide sensor data for users to verify empirically the advertisement content and display unit health.

Figure 18:
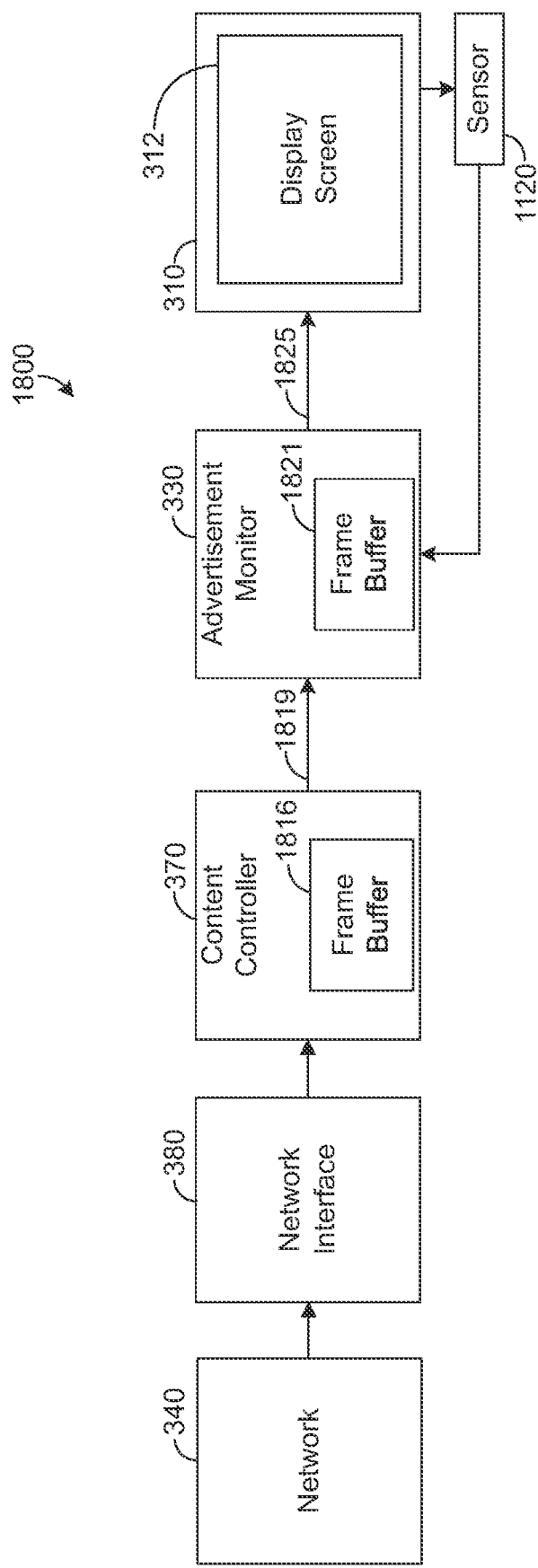
FIG. 18 is a block diagram illustrating an exemplary embodiment of an advertisement monitoring system.

FIG. 18 depicts an exemplary embodiment of an advertisement monitoring system 1800 having an advertisement monitor 330 that is configured to monitor advertisements displayed by a display device 310 to confirm the integrity of operation of the display device 310, as described above. In the embodiment shown by FIG. 18, a content controller 370, such as a desktop, laptop, content player or other type of computing device, is configured to receive from a network 340, or other source, data defining at least one advertisement to be displayed by the display device 310. As an example, the data may define an image or video stream for one or more advertisements to be displayed. As shown by FIG. 18, the content controller 370 may be coupled to a network interface 380, such as a modem or router, having circuitry that is configured to transmit and receive signals from the network 340. The network interface 380 may receive the images (e.g., a video stream) for one or more advertisements and transmit the images to the content controller 370, which has at least one frame buffer 1816 for buffering image frames, and the content controller 370 is generally configured to output image frames from the frame buffer 1816 for display by the display device 310.

In some embodiments, the video data transmitted over the network 340 to the content controller 370 is in a compressed or otherwise encoded format. As an example, the video data may be defined by compressed files of a certain format, such as MP4 or other type of known video format, or the video data may be defined by a compressed video stream. The content controller 370 may comprise a codec or other type of component to decompress or otherwise decode the received video data into uncompressed or otherwise decoded image frames that are buffered by the frame buffer 1816 before being output by the content controller 370. Thus, the image frames output by the content controller 370 are in an uncompressed or otherwise decoded format that can be transmitted directly to a display device, such as the display device 310 shown by FIG. 18, for display without further decompressing or other type of decoding by the display device.

However, in the embodiment depicted by FIG. 18, the advertisement monitor 330 is positioned between the content controller 370 and the display device 310 and receives the uncompressed or otherwise decoded image frames output by the content controller 370, and the advertisement monitor 330 is configured to process such image frames for monitoring purposes before sending them for display to the display device 310. Notably, the advertisement monitor 330 may accept, process and transmit a range of image and video resolutions from standard definition, full definition, high definition, ultra-high definition and other advance resolutions. In this regard, the advertisement monitor 330 may be connected to the content controller 370 by an electrical or optical connection 1819, such as a high-definition multimedia interface (HDMI) cable, digital visual interface (DVI) cable, DisplayPort, or other type of video cable or connection, for receiving the video stream from the content controller 370.

As shown by FIG. 18, the advertisement monitor 330 also has a frame buffer 1821 for buffering image frames of the video data. In this regard, the advertisement monitor 330 is configured to terminate the connection 1819 and temporarily store the frames of the video data in the frame buffer 1821. The advertisement monitor 330 is further configured to transmit frames from the frame buffer 1821 as a video stream to the display device 310. In this regard, the display device 310 may be connected to the advertisement monitor 330 by an electrical or optical connection 1825, such as an HDMI cable, DVI cable, DisplayPort, or other type of video cable or connection, for receiving the video stream from the advertisement monitor 330. The display device 310 is further configured to display the video stream, thereby displaying at least one advertisement defined by the video stream. In this regard, as shown by FIG. 18, the display device 310 has a display screen 312 on which the video stream may be displayed. Note that the display screen 312 may be a single, large panel or may comprise multiple smaller contiguous panels. Alternatively, an advertisement monitor 330 may connect to multiple separate display devices 310 and transmit image and video data streams to multiple display screens 312, each with a different advertisement campaign or schedule.

Having at least portions of the advertisement monitor 330 at the same site as the display device 310, the content controller 370, and the network interface 380 has various strategic advantages. As an example, connecting the advertisement monitor 330 between the content controller 370 and the display device 310 can help the advertisement monitor 330 to isolate a problem with the system 1800. As an example, with access to the video stream that feeds the display device 310, the advertisement monitor 330 can confirm whether the display device 310 is displaying the same image that is fed to it. If not, the advertisement monitor 330 can determine that the display device 310 is not operating properly. However, if the advertisement monitor 330 detects a problem in the video stream that is received from the content controller 370, then the advertisement monitor 330 can determine that the problem is not attributable to the display device 310 but rather is attributable to an upstream component, such as the content controller 370 or the network interface 380.

In addition, when the advertisement monitor 330 is local to (i.e., at the same site as) the display device 310 as shown by FIG. 18, then the advertisement monitor 330 may perform the monitoring described herein without participation of any content provider that is providing the advertising content to be displayed. In this regard, as described above, the advertisement monitor 330 has access to the uncompressed or otherwise decoded video stream from the content controller 370 and may compare this information to the feedback from the sensor 1120 to confirm various operational characteristics and states, such as whether the display device 310 is operating correctly, regardless of the content being displayed. Thus, it is unnecessary for a content provider to participate in the monitoring process or provide any additional information for use in monitoring. Indeed, as described above, the operation of the advertisement monitor 330 may be transparent to the other components of the system 1800.

Also, the advertisement monitor 330 may replace a portion of one or more image frames with special content, as described above, to facilitate the monitoring process. Since this operation is being performed locally by the advertisement monitor 330, it is unnecessary for the content provider that is providing the video data to the content controller 370 to embed the special content in the video data. That is, it is unnecessary for the content provider to participate in or even be aware of the monitoring process. Moreover, the advertisement monitor 330 is capable of providing independent monitoring of the hardware resources of the system 1800, such as the network interface 380, content controller 370, and display device 310, free of any perceived biases of the content providers or the parties responsible for the operation of such hardware resources who may be liable in the event of an operational problem.

Figure 26:
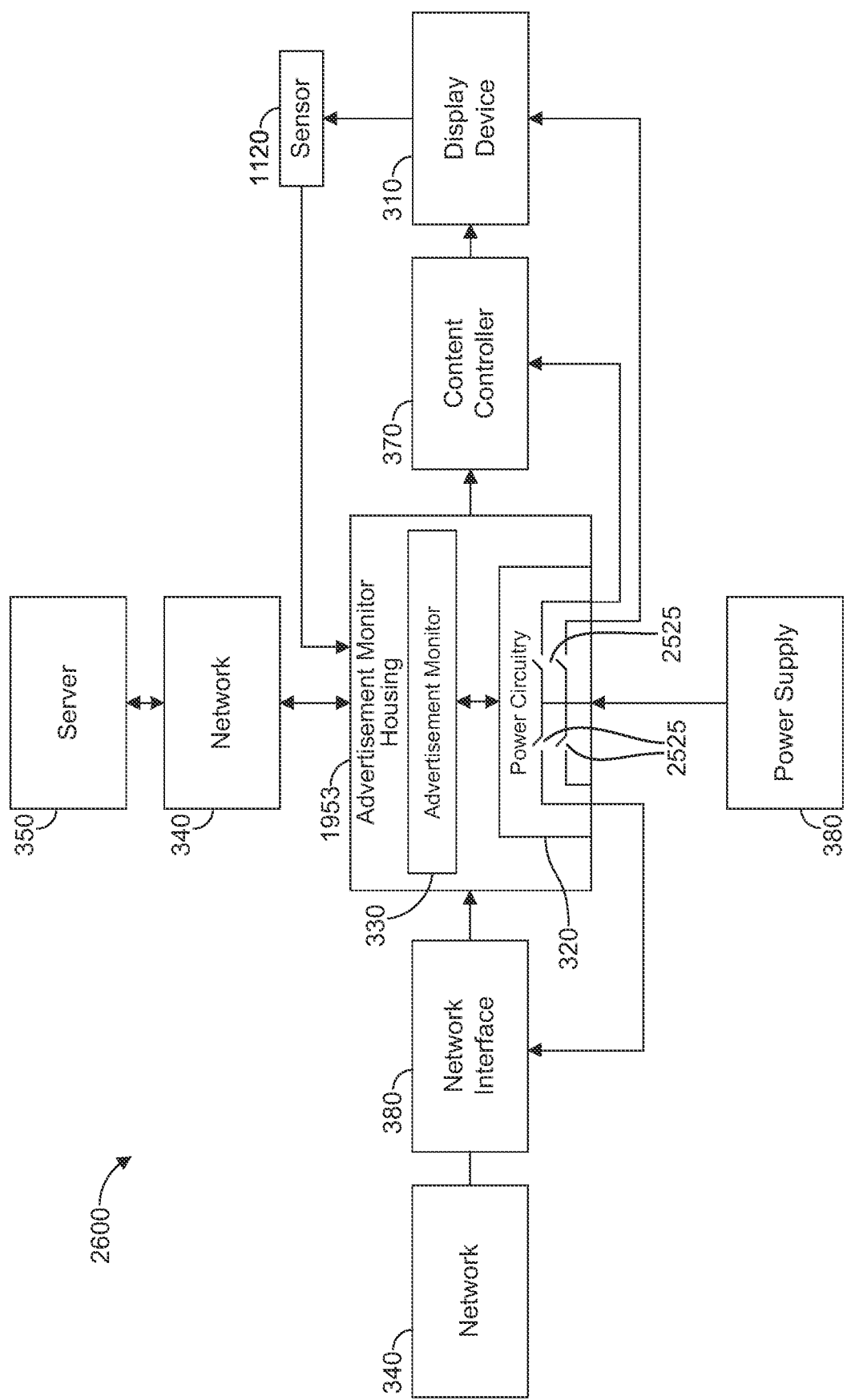
FIG. 26 is a block diagram illustrating an exemplary embodiment of an advertising monitoring system.

It should be noted that it is unnecessary for the video data received from the network 340 to be compressed or otherwise encoded or for the advertisement monitor 1953 to be connected between the content controller 370 and the display device 310. As an example, the advertisement monitor 330 may be connected between the network interface 340 and the content controller 370, as shown by FIG. 26. If the video data from the network interface 380 is compressed or otherwise encoded, then the advertisement monitor 330 may be configured to decompress or otherwise decode the video data and process the uncompressed or otherwise decoded video data for monitoring purposes, as described herein. Then, before sending the video data to the content controller 370, the advertisement monitor 330 may be configured to compress or otherwise encode the video data back into the same format as when it was received so that the presence and operation of the advertisement monitor 330 is transparent to the content controller 370.

In other embodiments, the advertisement monitor 330 may obviate the need to even have a separate content controller 370. In this regard, the advertisement monitor 330 may be configured to perform the same functions as the content controller 370, such as performing the decompression or other decoding typically performed by the content controller 370, and then provide the decompressed or otherwise decoded video data to the display device 310. In yet other embodiments, the content controller 370 may be integrated with the display device 310 such that the display device 310 has the ability to decompress or otherwise decode the video data. In such an embodiment, the advertisement monitor 330 may be connected between the network interface 380 and the display device 310 and may be configured to decompress or otherwise decode the video data, process the decompressed or otherwise decoded video data for monitoring purposes, and then compress or otherwise encode the video data, as described above. Yet other configurations and variations of the system 1800 are possible in other embodiments.

As previously described above, there are several different types of sensors and monitoring techniques that may be used by the advertisement monitor 330 to verify the operation of the display device 310 and confirm that the expected advertisement is being correctly displayed. For illustrative purposes assume that the system 1800 has an optical sensor 1120, such as a camera, that is configured to optically monitor a portion of the display screen 312. For illustrative purposes, assume that the optical sensor 1120 has a field of view that covers only a small group of pixels (e.g., less than one inch by one inch or other area) at or near a corner or border of the display screen 312, as previously described above. This region of the display screen 312 within the field of view of the sensor 1120 shall be referred to hereafter as the "monitored region." The sensor 1120 is configured to sense optical parameters, such as color or brightness, of light emitted from the monitored region and send data indicative of the sensed parameters to the advertisement monitor 330, which then determines whether the display device 310 is operating correctly and displaying the correct advertisement based on such data.

As previously described above, in some embodiments, the advertisement monitor 330 may be configured to manipulate the data defining the advertisement to facilitate the monitoring process. As an example, for a given frame stored in the frame buffer 1821, the advertisement monitor 330 may replace the original pixel data (e.g., color and/or brightness values) for the monitored region with new pixel data defining a reference image to be sensed by the sensor 1120. As an example, the advertisement monitor 330 may insert color values of the same color (e.g., red) so that each pixel in the monitored region should display this specific color. In such an example, the optical sensor 1120 senses the colors of these pixels for the frame, and sends data indicative of the sensed colors to the advertisement monitor 330. If the sensed color values match the expected color, then the advertisement monitor 330 determines that the display device 310 has correctly displayed the frame. Otherwise, the advertisement monitor 330 may determine that the frame has been incorrectly displayed and provide an alert, as previously described above.

Similar techniques may be used to confirm the correct display of other frames over time. However, it is unnecessary for a single color to be used for the monitored region or for the same colors to be used for each frame. As an example, the pixel data for the monitored region may be controlled to display a certain pattern of colors rather than a single color. Also, the colors may be controlled to display one or more characters or values, such as an advertisement determinant, as previously described above. In another example, the colors displayed over multiple frames may be encoded or modulated to indicate an encoded determinant. As an example, the color of the monitored region may be transitioned from frame-to-frame between multiple colors at a rate that indicates an encoded determinant. For example, the monitored region may be transitioned between red and white according to a timing sequence to indicate an identifier using Morse code (where the patterns and durations of color transitions over time indicate Morse code letters or values) or some other coding scheme. In such an embodiment, the advertisement monitor 330 compares the coded determinant defined by pixel data inserted into the frame buffer 1821 over multiple frames to the coded identifier read via the sensor 1120 for such frames to confirm that they match. If the same coded determinant is not sensed by the sensor 1120, then the advertisement monitor 330 may detect the occurrence of a display error. In other embodiments, other techniques may be used to control the display parameters of the pixels in the monitored region.

In some embodiments, the advertisement monitor 330 is configured to manipulate the pixel values in the frame buffer 1821 in order to facilitate calibration of the sensor 1120. In this regard, mounting of the sensor 1120 may be imprecise and variations in the mounting position or location of the sensor 1120 affects the sensor's field of view and thus which pixels are in view of the sensor 1120. The color or brightness sensed by the sensor 1120 may vary from one sensor to another and also may vary based on the mounting location or position of the sensor 1120, as well as environmental conditions.

During a calibration process, prior to normal operation, the advertisement monitor 330 may be configured to insert into the frame buffer 1821 predefined graphical content, referred to herein as "reference data," to be used for calibrating the sensor 1120. As an example, over multiple frames, the advertisement monitor 330 may set the color values of different sets of pixels per frame to a specific color and then compare this color value to the color values sensed by the sensor 1120. The sets of pixels exhibiting this color can be changed for each frame until the color predominantly sensed by the sensor 1120 matches this specific color. Using this technique, the advertising monitor 330 can identify which pixels are within view of the sensor 1120, and the monitor 330 can then later manipulate the pixel data for such pixels during normal operation to verify correct operation of the display device 310, as described above. Also, the advertisement monitor 330 may use color values sensed by the sensor 1120 during the calibration process to calibrate the color or brightness range sensed by the sensor 1120 using conventional calibration algorithms.

As described above, once the calibration process is performed, the advertisement monitor 330 may manipulate the pixel data for the monitored region to facilitate monitoring of the operation of the display device 310. However, it is possible to monitor the operation of the display device 310 without changing the pixel data in the frame buffer 1821 relative to the pixel data received from the content controller 370. As an example, for a given frame, rather than changing the pixel data for the monitored region, the advertisement monitor 330 may be configured to read such pixel data from the frame buffer 1821 (noting that such pixel data is from the original video stream received by the content controller 370 from the network 340) and store such pixel data for comparison to the data from the sensor 1120. In this regard, when the frame is displayed by the display device 310, the sensor 1120 is configured to sense the color values or other display parameters, such as brightness, for the pixels in the monitored region and transmit data indicative of such sensed parameters to the advertisement monitor 330. The advertisement monitor 330 may then compare the data received from the sensor 1120 to the stored data originally read from the frame buffer 1821 to confirm that the image (e.g. color and/or brightness) defined in the frame buffer 1821 for the monitored region sufficiently matches the image sensed by the sensor 1120. If not, the advertisement monitor 330 may detect a display error and transmit an alert, as previously described above.

Notably, in the instant embodiment, the advertisement monitor 330 may be configured to manipulate the values in the frame buffer 1821 for the purposes of calibrating the sensor 1120 yet refrain from manipulating the pixel data in the frame buffer 1821 during normal operation so as not to interfere with or change the displayed advertisement in any way. In yet other embodiments, other techniques may be used to monitor the operation of the display device 310 and confirm that it is correctly displaying the advertisement sent by the content controller 370, including any of the techniques described above for other embodiments described with reference to FIGS. 7, 11, and 16.

Figure 19:
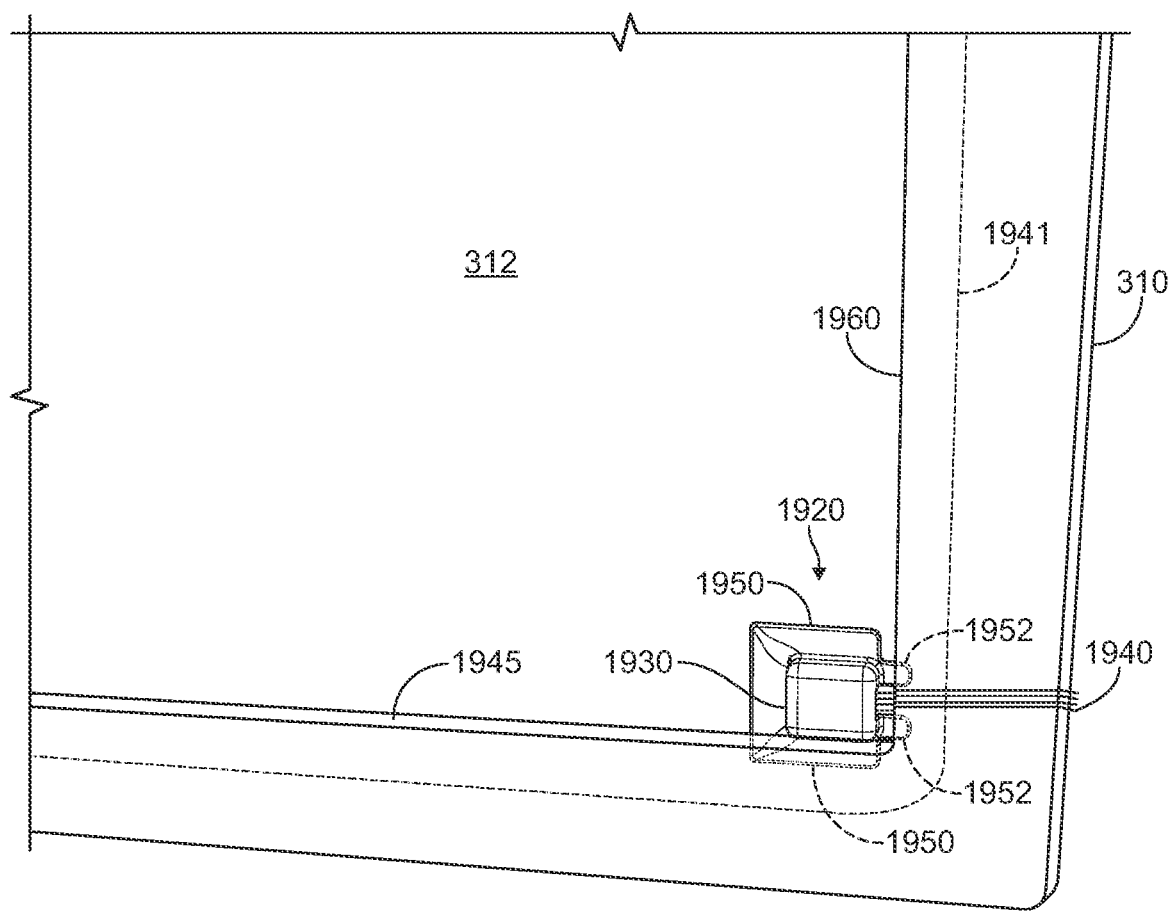
FIG. 19 illustrates an exemplary embodiment of a sensor housing mounted on the display area of a display device.

In some embodiments, a sensor 1120 may be attached to a display device 310 using a sensor housing. For example, FIG. 19 illustrates an exemplary sensor housing 1920 for mounting a sensor 1120 (FIG. 18) on a display screen 312 of a display device 310. In the embodiment shown by FIG. 19, the sensor housing 1920 and, thus, sensor 1120 that is housed by it are detachably coupled to the display device 310 and, in particular, the display screen 312 such that the sensor housing 1920 and sensor 1120 can be easily removed by hand. However, it should be emphasized that other techniques for positioning the sensor 1120 are possible, including permanently coupling the sensor 1120 to the display device 310 or integrating the sensor 1120 with the hardware of the display device 310 during manufacturing. As an example, the sensor 1120 may be embedded in the display screen 312 or other portion of the display device 310 during manufacturing.

The sensor housing 1920 has a raised body 1930 for holding a sensor (which is hidden by the housing 1920 in FIG. 19) to be used to monitor the display device 310. As shown by FIG. 19, the body 1930 has a thickness (in a direction perpendicular to the flat surface of the display screen 312 onto which the sensor housing 1920 is mounted) of about 5 millimeters (mm), though other thicknesses are possible in other embodiments. The body 1930 is sufficiently thick to facilitate grasping of it by hand, such as when the sensor housing 1920 is being mounted on or removed from the display device 310. In the embodiment shown by FIGS. 19-22, the body 1930 is rectangular having a length and width (perpendicular to its thickness) of about 16.6 mm and 10.9 mm, respectively. In other embodiments, other shapes and dimensions are possible.

As shown by FIG. 19, the sensor housing 1920 has at least one tab 1950 extending from the body 1930. In the embodiment shown by FIGS. 19-22, the tab 1950 extends around the body 1930 on three sides (i.e., an upper side, a lower side, and a left side). In other embodiments, the tab 1950 may extend along any number of sides (e.g., one or more). The tab 1950 is arranged for use in mounting the sensor housing 1920 on the display screen 312 of the display device 310. In this regard, the tab 1950 is sufficiently thin to permit it to slide into a small space or gap between components of the display device 310 so that the tab 1950 snugly fits between such components. Frictional forces from the snug fit help to hold the sensor housing 1920 (and, thus, the sensor held by the sensor housing 1920) in place. In some embodiments, the tab 1950 is inserted between the display screen 312 and a frame 1960 of the display device 310 so that a bottom of the sensor housing 1920 contacts and is held against the surface of the display screen 312, as will be described in more detail below.

In this regard, as shown by FIG. 19, many conventional display devices 310 have a frame 1960 that runs along the edge of the display device 312. Such a frame is sometimes referred to and will be referred to hereafter for simplicity of illustration as a "bevel." A portion of the bevel 1960 may extend over the surface of the display screen 312 such that the edge (represented by dotted line 1941 in FIG. 19) of the display screen 312 is hidden and, thus, protected by the bevel 1960. Indeed, the bevel 1960 is typically composed of a rugged material, such as plastic, that permits a user to grasp or otherwise touch the bevel 1960, such as when moving or mounting the display device 310, without touching or damaging the display screen 312. In some cases, the edge of the display screen 312 may abut the bevel 1960.

Typically, there is a small space or gap that exists between the bevel 1960 and the display screen 312 along a horizontal edge 1945 (and a vertical edge) of the bevel 1960. In the embodiment shown by FIG. 19, the sensor housing 1920 is mounted to the display device 310 by sliding at least a portion of a tab 1950 into the gap between the bezel 1960 and the display screen 312. In the embodiment shown by FIG. 19, a portion of the tab 1950 is slid sufficiently far into the gap so that the body 1930 contacts and rests against the bevel 1960. In such embodiment, the weight of the sensor housing 1920 may be supported by the bevel 1960, and frictional forces (and/or other forces) exerted on the inserted portion of the tab 1950 by the display screen 312 and the bevel 1960 help to hold the sensor housing 1920 in place.

In the exemplary embodiment shown by FIGS. 19-22, the sensor housing 1920 has a pair of smaller tabs 1952 that extend from the body 1930 on a side, similar to the larger tab 1950 that extends around multiple sides of the main body 1930. There is a gap 1926 (FIG. 20) between the smaller tabs 1952 to accommodate a sensor connector, as will be described in more detail below. The sensor housing 1920 may be positioned at the corner of the bezel 1960, as shown by FIG. 19, so that the tabs 1952 may be inserted into a gap between the display screen 312 and a vertical edge of the bezel 1960. Similar to the tab 1950, the snug fit of the tabs 1952 between the display screen 312 and the bezel 1960 may help hold the sensor housing 1920 in place. However, in other embodiments, it is unnecessary for the sensor housing 1920 to be positioned at the corner of the bezel 1960 or for multiple tabs to be inserted between the bezel 1960 and the display screen 312.

Figure 20:
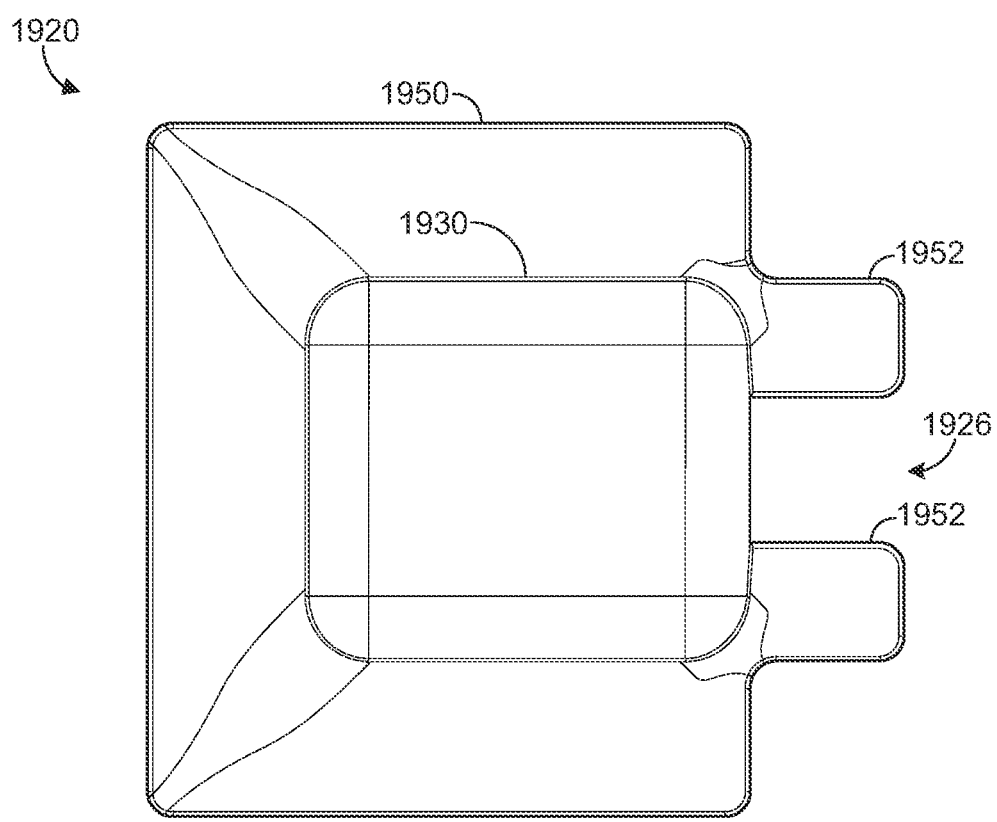
FIG. 20 illustrates a top view of the sensor housing depicted by FIG. 19.
Figure 21:
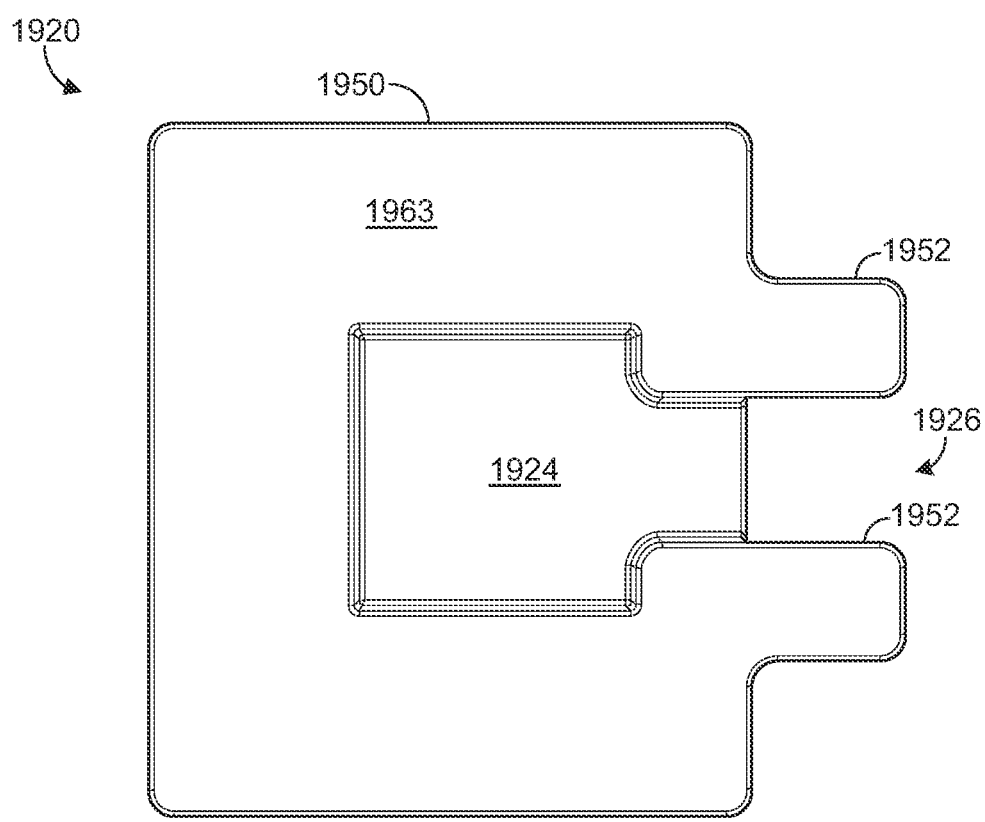
FIG. 21 illustrates a bottom view of the sensor housing depicted by FIG. 19.
Figure 22:
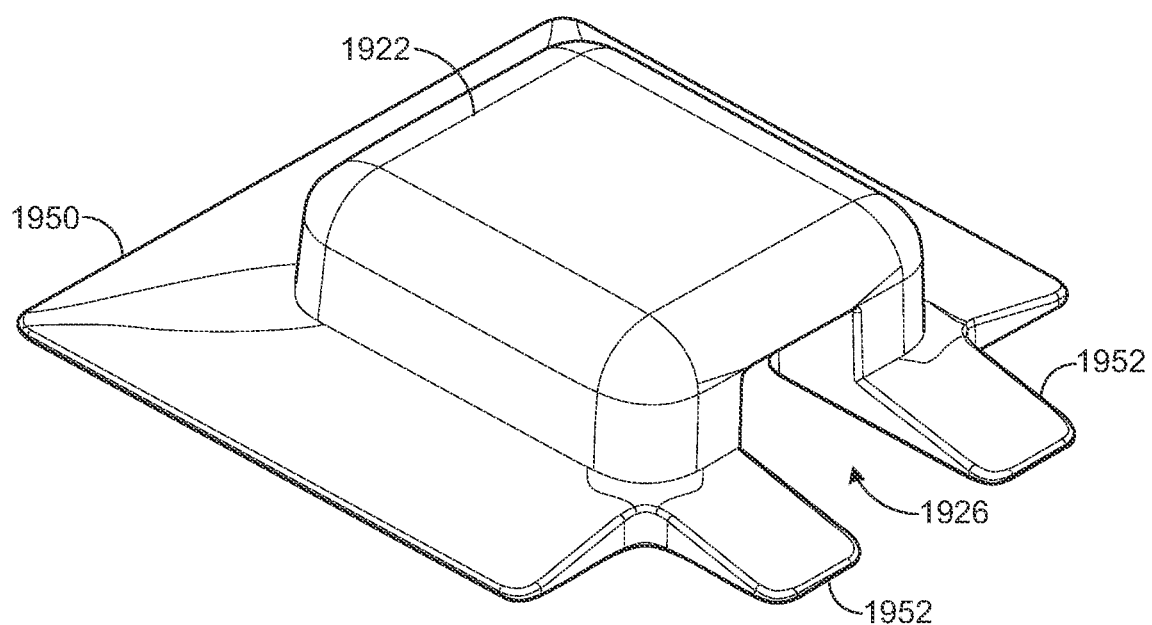
FIG. 22 illustrates a perspective view of the sensor housing depicted by FIG. 19.

As shown by FIGS. 20-22, each of the tabs 1950, 1952 may be tapered such that the thickness of the tab increases from an end or edge of the tab to the body 1930. This tapering facilitates insertion of the tab into the gap between the display screen 312 and the bezel 1960. This tapering also helps to accommodate gaps of different sizes to help ensure a snug fit. In this regard, the tab 1950, 1952 is the thinnest at its outer edge, helping to ensure that the tab is sufficiently small to be inserted into the gap, and the thickness of the tab increases as it is pushed into the gap such that a point is reached at which a portion of the tab between the display screen 312 and bezel 1960 is sufficiently thick to ensure a snug fit. However, in other embodiments, it is unnecessary for any of the tabs 1950, 1952 to be tapered.

FIG. 21 illustrates a bottom view of the sensor housing 1920. As shown by FIG. 21, the sensor housing 1920 has a cavity 1924 that is shaped for receiving the sensor 1120 (FIG. 18) to be used in monitoring the display device 310, as described above. In some embodiments, the cavity 1924 may be shaped such that the sensor 1120 (FIG. 18) snugly fits into the cavity 1924 so that frictional forces between the sensor 1120 and the housing 1920 hold them together. A bottom surface 1963 of the sensor housing 1920 is flat and contacts the display screen 312 when the housing 1920 is mounted on the display device 310, as shown by FIG. 19. The display screen 312 of a conventional display device 310 may have a flat surface corresponding to the flat surface 1963 of the sensor housing 1920 in contact with the display screen surface.

In some embodiments, the sensor housing 1920 is composed of a relatively soft, pliable material, to help prevent the housing 1920 from scratching or otherwise damaging the display screen 312. Furthermore, using a flexible material may permit the housing 1920 to accommodate the curvature of a display screen 312 for an embodiment in which the surface of the display screen 312 is curved. However, the material preferably has sufficient rigidity to permit one or more of the tabs 1950, 1952 to be wedged into a gap between the display screen 312 and the bezel 1960 and hold the sensor housing 1920 in place, as described above. In one embodiment, the material of the sensor housing 1920 is polycarbonate plastic, but other types of materials are possible in other embodiments.

In some embodiments, the sensor housing 1950 is opaque such that the sensor 1120 is hidden from view. Further, when the sensor 1120 is mounted with the sensor housing 1920 as shown by FIG. 19 and described herein such that the sensor 1120 is positioned against or close to the surface of the display screen 312, the sensor 1120 is generally prevented from sensing an appreciable amount of ambient light. That is, the sensor 1120 is able to sense light from the display screen 312 but is unable to sense an appreciable amount of light from the surrounding environment, and the sensor's field of view is thus limited to the display screen 312. Such a feature may help to alleviate privacy or security concerns over use of the sensor 1120 when the display device 310 is used in environments where such concerns may be relevant. Further, having an opaque sensor housing 1920 can prevent ambient light from the surrounding environment from even reaching the electronics in the cavity 1924 helping to reassure users concerned about privacy or security issues. An opaque sensor housing 1920 also helps to hide the sensor 1120 and the PCB on which it is mounted so that at least some users may be unaware that the sensor 1120 is event present. In other embodiments, other types of materials may be used for the sensor housing 1920, and it is unnecessary for the material of the sensor housing 1920 to be opaque.

As described above, a sensor connector 1940 may be used to connect the sensor 1120 with the advertisement monitor 330. Such a connector 1940 may provide an electrical or optical connection for enabling communication between the sensor 1120 and the monitor 330. As an example, a fiber optic connection or an electrical connection, such as a wire or an electrical ribbon connector, may be used. In other embodiments, wireless signals may be communicated between the sensor 1120 and the monitor 330, thereby obviating the need of having a physical connection between the two components.

Figure 23:
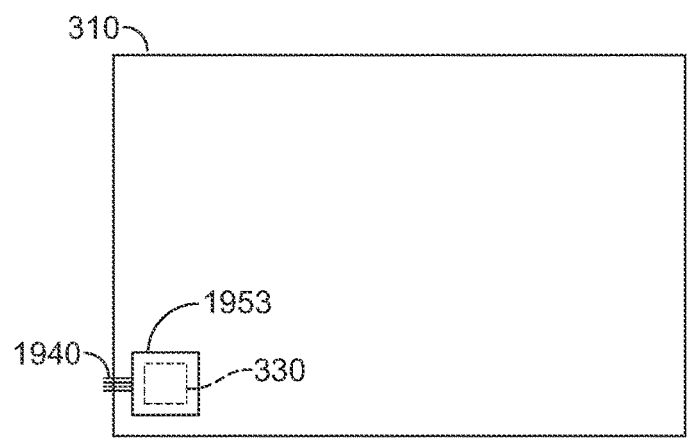
FIG. 23 illustrates an exemplary housing for an advertisement monitor mounted on the back of the display device depicted by FIG. 19.

The sensor connector 1940 carries the sensor signals to the advertisement monitor 330 for detection of display parameters, such as brightness, color, advertising determinants, or optical signatures as described above. For example, FIG. 23 illustrates an exemplary housing 1953 for an advertisement monitor 330 mounted on the back of the display device 310. In the embodiment, shown by FIG. 23, the advertisement monitor housing 1953 houses components of the advertisement monitor 330, such as the components shown by FIG. 17, which are hidden by the housing 1953 in FIG. 23. The sensor connector 1940 may pass around the edge of the display device 310 and connect to the advertisement monitor 330 within the housing 1953. In other embodiments, the sensor connector 1940 may pass through the display device 310 (e.g., underneath the bezel 1960) such that it is hidden from view, if desired. The advertisement monitor housing 1953 may be mounted to the back of the display device 310 using screws, adhesive (e.g., double-sided tape), hook-and-loop fastener strips, or through other known means.

While the sensor housing 1920 has been shown placed in the lower right corner of the bevel 1960, it may easily be placed in any corner or anywhere along the bezel 1960. Having one or more tabs 1950, 1952 extending from multiple sides of the body 1930 can help allow the sensor housing 1920 to be easily positioned at a multitude of locations, such as in any corner of the bezel 1960. As an example, having a tab 1950 extend from the body 1930 on opposite sides (e.g., an upper side and a lower side) as shown by FIG. 19 allows the sensor housing 1920 to be easily rotated and positioned in another bezel corner. For example, in FIG. 19, the sensor housing 1920 is positioned in a bottom right corner of the bezel 1920 (such that the connector 1940 extends to the right as shown) with a lower portion of the tab 1950 extending downward and inserted into a gap between the display screen 312 and the bezel edge 1945. In another embodiment, the sensor housing 1920 may be rotated 180 degrees and positioning in a lower left corner of the bezel 1920 (such that the connector 1940 extends to the left) with the upper portion of the tab 1950 shown by FIG. 19 extending downward and inserted into the gap between the display screen 312 and the bezel edge 1945.

In some embodiments, the sensor housing 1920 is secured using the tabs 1950, 1952 and no adhesive. In other embodiments, the sensor housing 1920 may be secured using one or more tabs 1950, 1952 and an adhesive. In yet other embodiments, the sensor housing 1920 may be secured with adhesive and no tabs 1950, 1952, and yet other techniques may be used to mount the sensor housing 1920 on the display device 310 or otherwise position the sensor housing 1920 and, thus, sensor 1120 near the display screen 312. Further, in some embodiments, such as when the system is not being used in an environment for which there are privacy or security concerns, the sensor 1120 may be positioned far away from the display device 310 or such that the sensor 1120 has field of view greater than just the display screen 312. In some embodiments, such as when an adhesive is being used to mount the sensor housing 1920, the tabs 1950, 1952 are unnecessary. Any of the tabs 1950, 1952 not being used to secure the sensor housing 1920 can be removed if desired.

Figure 24:
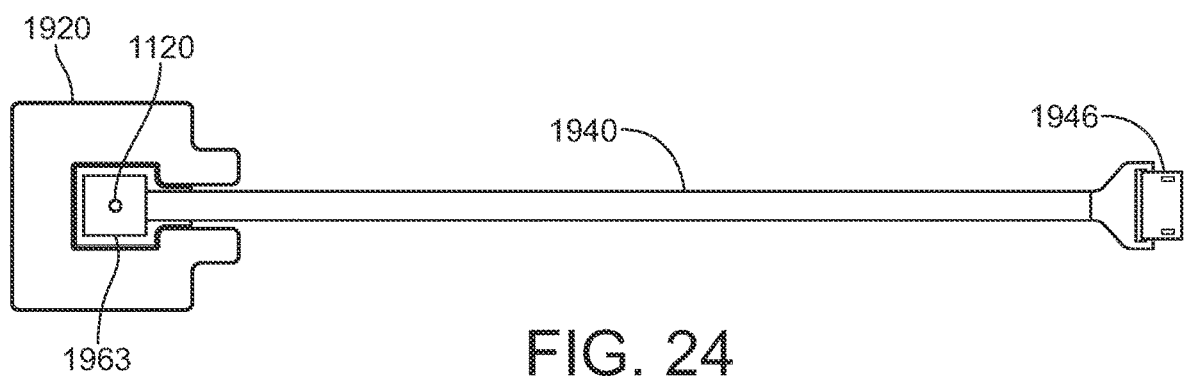
FIG. 24 illustrates an exemplary sensor housed by the sensor housing depicted by FIG. 19 with a connector for connecting the sensor to an advertisement monitor, such as is depicted by FIG. 22.

FIG. 24 illustrates the sensor housing 1920 with a sensor 1120 positioned within the cavity 1924 (FIG. 21) of the housing 1920. In the embodiment depicted by FIG. 24, the sensor 1120 is mounted on a printed circuit board (PCB) 1963 connected to the connector 1940. As shown by FIG. 24, the connector 1940 extends between the two smaller tabs 1952 within the gap 1926 (FIG. 21). When the sensor housing 1920 is mounted on the display device 310, as shown by FIG. 19, the sensor 1120 faces the display screen 312 with a field of view limited to a small area of the display screen 312 and possibly contacts the surface of the display screen 312 depending on its depth within the housing cavity 1924 (FIG. 21).

An end of the connector 1940 is connected to a communication interface 1946 for interfacing with hardware of the advertisement monitor 330. In the embodiment depicted by FIG. 24, the interface 1946 is a universal serial bus (USB) interface for establishing electrical connectivity with the advertisement monitor 330, but other types of interfaces may be used in other embodiments.

Figure 27:
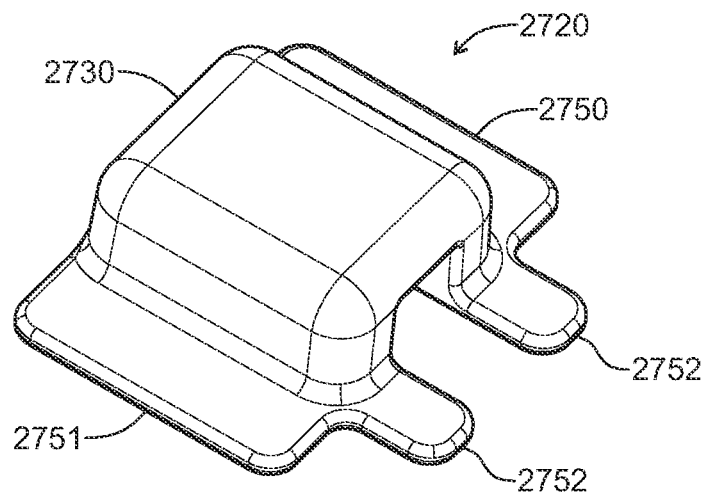
FIG. 27 illustrates a perspective view of a sensor housing.
Figure 28:
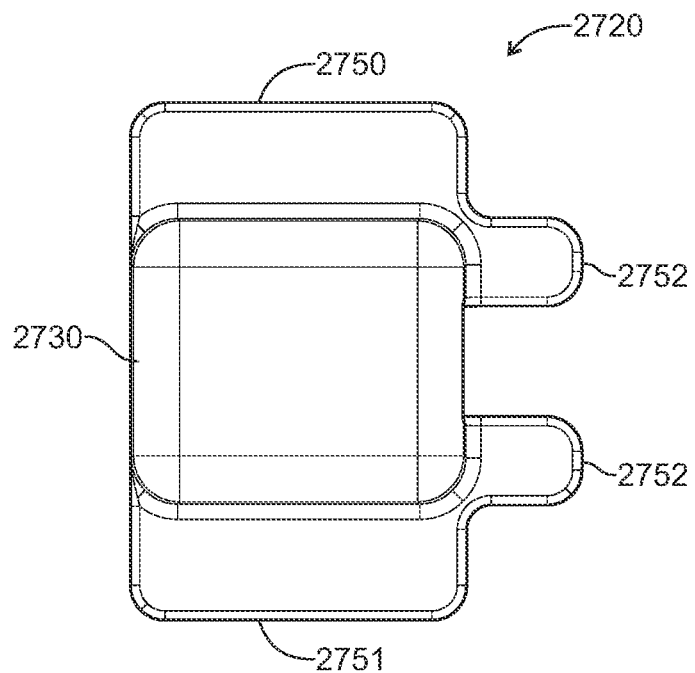
FIG. 28 illustrates a top view of the sensor housing depicted by FIG. 27.

FIGS. 27 and 28 depict an exemplary sensor housing 2720 similar to the one depicted by FIGS. 20-22. Indeed, except as otherwise described hereafter, the sensor housing 2720 depicted by FIGS. 27 and 28 is identical to the sensor housing 1920 depicted by FIGS. 20-22. In this regard, the housing 2720 has a raised body 2730 that is hollow for accommodating the sensor 1120, like the body 1930 shown in FIGS. 20-22. Further, the housing 2720 has a pair of small tabs 2752 similar to the tabs 1952 of FIGS. 20-22. However, rather than having a single tab 1920 that extends from the body 1930 on three sides as shown by FIGS. 20-22, the housing 2720 has an upper tab 2750 and a lower tab 2751 that extend from the body 2730 as shown by FIG. 27. The lower tab 2751 may be inserted between the display screen 312 and the bevel 1960, similar to the lower portion of the tab 1950 shown by FIG. 19, to help hold the housing 2730 in place against the display screen 312. When the housing 2720 is rotated 180 degrees and positioned in the left corner of the bezel 1960, the upper tab 2750 may be inserted between the display screen 312 and the bezel 1960. Thus, having the upper tab 2750 and the lower tab 2751 on opposite sides of the body 2730 as shown permits the housing 2720 to be easily mounted in any corner of the bezel 1960, as may be desired.

Note that the tabs 2750, 2751, 2752 of the housing 2720 are not tapered as shown for the tabs 1950, 1952 of FIGS. 20-22. That is, both the top surface and the bottom surface of each tab 2750, 2751, 2752 are flat in the embodiment depicted by FIGS. 27 and 28. The edges of the tabs 2750, 2751, 2752 have a taper (e.g., are rounded or pointed), as shown, to facilitate insertion of the tab between the display device 312 and bevel 1960. In other embodiments, other configurations of the sensor housing are possible.

Figure 25:
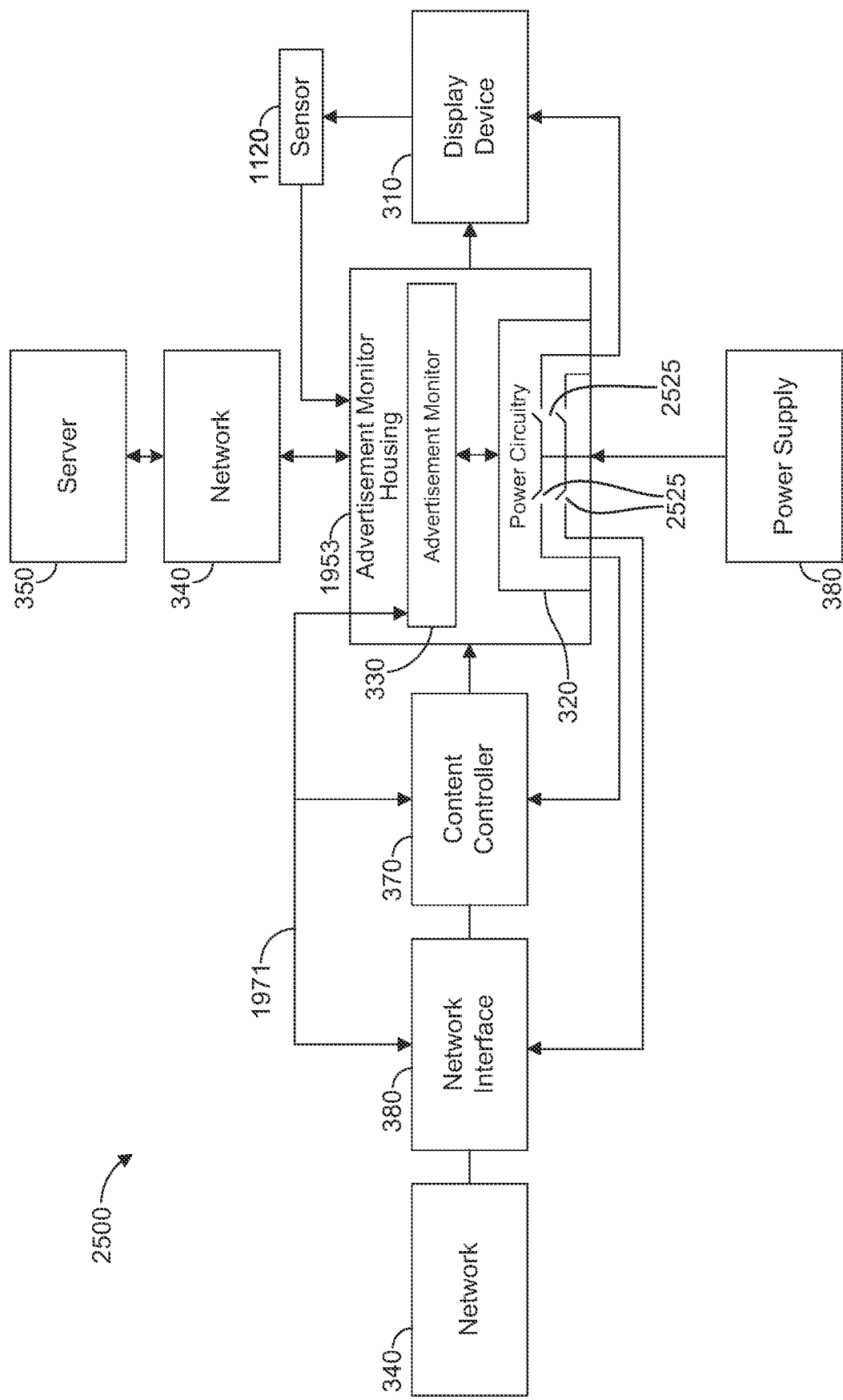
FIG. 25 is a block diagram illustrating an exemplary embodiment of an advertisement monitoring system.

FIG. 25 is a block diagram illustrating an exemplary embodiment of an advertisement monitoring system 2500. Except as otherwise indicated hereafter, the operation and configuration of the system 2500 may be the same as described above for the system 1800 depicted by FIG. 18. FIG. 25 shows the advertisement monitor 330 coupled to a power supply 380 for providing power to other components of the system 2500, such as the network interface 380, content controller 370 and display device 310. For simplicity of illustration, the components of the system 2500, including the network interface 380, content controller 370, and display device 310, residing at the location of the displayed advertisement shall be referred to as "local components." If the advertisement monitor 330 does not have a separate power supply (not shown), the advertisement monitor 330 may also use power from the power supply 380 for powering the electrical components of the monitor 330. In the embodiment depicted by FIG. 25, power circuitry 320, such as that shown by FIG. 3, may be housed within the advertisement monitor housing 1953 that is used to house components (e.g., circuitry) of the advertisement monitor 330. However, in other embodiments, the power circuitry 320 may reside external to the housing 1953, if desired.

In the embodiment depicted by FIG. 25, the power circuitry 320 may be used to monitor the power signal provided to the display device 330 as described above with reference to the embodiment shown by FIG. 3. In addition to or in lieu of this functionality, the power circuitry 320 may also be configured to control the power delivered to one or more local components of the system 2500, such as the network interface 380, the content controller 370, and/or the display device 310. As an example, as will be described in more detail below, the power circuitry 320 may operate under the direction and control of the advertisement monitor 330 to temporarily interrupt power from one or more local components, such as the network interface 380, the content controller 370, or the display device 310, to force a reboot of such local component in response to a detection of an operational error associated with the local component.

Note that there are various types of circuit components that may be used by the power circuitry 320 to control the power delivered to any of the local components of the system 2500. In the embodiment depicted by FIG. 25, the power circuitry 320 comprises a plurality of power switches (e.g., relays) 2525 that are respectively coupled to the local components, such as the network interface 380, content controller 370, and the display device 310. When the advertisement monitor 330 determines that a local component should be rebooted, the advertisement monitor 330 is configured to control the power circuitry 320 to temporarily interrupt a power signal transmitted to the local component. As an example, the advertisement monitor 330 may control the power circuitry 320 such that the switch 2525 connected to such local component is temporarily transitioned from a closed state to an open state, thereby preventing power from the power supply 380 from flowing to the local component. After expiration of a predefined time period (such as several seconds to help ensure that residual capacitance in the local component is drained), the advertisement monitor 330 may be configured to control the power circuitry 320 such that the foregoing switch 2525 transitions back to the closed state, thereby permitting electrical power to begin flowing again from the power supply 380 to the local component. Upon receiving such electrical power, the local component may then power up and perform a booting process such that the opening and closing of the switch 2525 coupled to it effectively causes a reboot of the local component. Note that temporarily stopping the flow of power to a component to force a reboot of the component is generally referred to herein as "power cycling" the component.

In other embodiments, other techniques may be used to initiate a reboot of a local component. As an example, the advertisement monitor 330 may be configured to communicate a command to the local component, which then initiates a reboot in response to the command. However, in such an embodiment, the local component may be specially configured for communication with the advertisement monitor 330. Controlling the rebooting of local components through the use of the power circuitry 320, as described above, has the advantage of enabling the advertisement monitor 330 to control rebooting of the local components without requiring the local components to be specially configured for operation with the advertisement monitor 330. Thus, the advertisement monitor 330 may be used in a system 2500 with conventional local components that are not specially designed to interoperate with the advertisement monitor 330, and the operation of the advertisement monitor 330 may be transparent to these other local components.

In FIG. 25, the advertisement monitor 1953 is shown to be connected to the network interface 380 and the content controller 370 by at least one communication connection 1971 to permit communication of data and commands between the advertisement monitor 330 and both of the network interface 380 and advertisement control 370. As an example, the communication connection 1971 may be used for transmission of reboot commands as described above in the foregoing paragraph. Also, the advertisement monitor 330 may be configured to request and receive, from the network interface 380 and the content controller 370, data indicative of the operational state of such components, and the advertisement monitor 330 may use this information for monitoring the operation of the network interface 380 and the content controller 370, as described above.

The communication connection 1971 may be a serial, Ethernet, or other type of connection for permitting communication with the advertisement monitor 1971. If desired, separate connections 1971 may be made for each of the network interface 380 and the content controller 370. Also, the advertisement monitor 330 may be similarly connected to the display device 310 by the communication connection 1971 or other connection to permit the communication of commands and data with the advertisement monitor 330, as described above for the network interface 380 and the content controller 370. In some embodiments, the local components may be configured to communicate with the advertisement monitor 330 wirelessly. However, it should be emphasized that communication between advertisement manager 330 and the local components (as well as the use of the communication connection 1971) are unnecessary, and the advertisement monitor 330 may be configured to infer or otherwise determine the operational states of the local components using other techniques such as analyzing information from the sensor 1120, the images received from the content controller 370, and information from the power circuitry 320, as described above. Indeed, as indicated above, it is possible for the operation of the advertisement monitor 330 to be transparent to the local components such that the local components do not need to be specially configured for communication with the advertisement manager 330.

Note that there are various techniques that the advertisement monitor 330 may use to detect an error associated with a particular local component for which forcing a reboot of the local component may help to resolve or mitigate the error. For example, in analyzing the video data received from the content controller 370, such as the image frames stored in the frame buffer 1821 of the advertisement monitor 330, the advertisement monitor 330 may determine that the images defined by the video data are not transitioning properly. In this regard, the content controller 370 may be displaying a message (e.g., an error message, a software update message, or some other message for informing a user about a problem or other operational condition of the content controller 370). As an example, such message may be displayed in a popup window that is superimposed on the advertisement such that a significant portion of the advertisement is occluded by the popup window. In such an example, the video data of a significant portion of the frame buffer 1816 (FIG. 18) displaying the operational message may remain constant over an extended time. In another example, a processor of the content controller 370 may be caught in an endless loop due to a software error such that the values in the frame buffer 1816 of the advertisement monitor 1816 are not transitioning as expected. In response to a determination that a set of pixels of the images received from the content controller 370 have not sufficiently transitioned to different values for at least a threshold amount of time, the advertisement monitor 330 may be configured to detect an occurrence of an operational problem with the content controller 370. In response, the advertisement monitor 330 may be further configured to cause the power circuitry 320 to temporarily open the switch 2525 coupled to the content controller 370 to force a reboot of the content controller 370. The reboot may cause the content controller 370 to begin operating normally without displaying any operational messages that would other adversely affect the advertisements being displayed.

The advertisement monitor 330 may use similar techniques to detect problems with other local components and force reboots in a similar manner. As an example, based on feedback from the sensor 1120, the advertisement monitor 330 may similarly determine that the area of the display screen 312 being monitored by the sensor 1120 is not transitioning as expected. However, during such time, the corresponding area of the frame buffer 1816 of the content controller 370 may be transitioning, thereby indicating that the operational problem is with the display device 310, not the content controller 370. In such case, the advertisement monitor 330 may be configured to detect an occurrence of an operational problem with the display device 310 and, in response, cause the power circuitry 320 to temporarily open the switch 2525 coupled to the display device 310 to force a reboot of the display device 310. The reboot may cause the display device 310 to begin operating normally.

In some cases, the advertisement monitor 330 may be configured to reboot more than one local component in response to detection of an operational problem. As an example, when the advertisement monitor 330 determines that the values of the image data in the frames from the fame buffer 1816 (FIG. 18) of the content controller 370 are not transitioning properly, as described above, the problem may originate with the network interface 380 such that rebooting of the content controller 370 does not resolve the problem. In such an example, the advertisement monitor 330 may be configured to cause the power circuitry 320 to temporarily open the switch 2525 coupled to the network interface 380 to force a reboot of the network interface 380 to see if such a reboot resolves the operational problem. In yet other examples, the advertisement monitor 330 may make rebooting or power cycling decisions based on other factors and for other reasons.

Note that analysis of image frames by the advertisement monitor 330 may be used to detect content errors in other ways relative to those described above. As an example, one or more copies of the image frames stored in the frame buffer 1821 awaiting playback may be analyzed to confirm that content is displayed as intended. This analysis may be performed locally by the advertisement monitor 330, as described above, or image frames from the frame buffer 1821 may be transmitted over a network 340 to a remote location, such as the server 350 depicted by FIG. 25, where the image frames can be analyzed remotely. Such analysis may be automatically performed at the server 350 by portions of the advertisement monitor 330 implemented at the server 350, as described above. However, it is also possible for the server 350 to provide the image frames for analysis by a user who may view the image frames to confirm that the content is being displayed correctly.

As an example, the server 350 may display the image frames directly to a user or transmit the image frames to another device, such as a smartphone or other computing device, which then displays the image frames to a user. If the user determines that there is a problem with the displayed content, such as an unwanted object (e.g., popup window) being displayed over an advertisement, the user may provide a user input indicating a corrective action to be taken in order to correct or mitigate the problem. As an example, the user input may indicate that one or more of the local components, such as the network interface 380, content controller 370, and/or display device 310, are to be rebooted. The server 350 may be configured to receive such user input and then transmit instructions to the advertisement monitor 330 at the site of the local components via the network 340 for instructing the advertisement monitor 330 to take the appropriate action for attempting to alleviate the problem. In response, the advertisement monitor 330 then performs the instructed action. As an example, if the instructed action is to reboot one of the local components of the system 2500, the advertisement monitor 330 may be configured to interrupt the power signal delivered to such local component to force a reboot or initiate a reboot of such local component using other techniques. Notably, monitoring the advertisements using the video data passing through the advertisement monitor 330 or power signals, as described further herein, does not necessarily involve the use of the sensor 1120, and the sensor 1120 may be omitted from the system 2500 in at least some embodiments, if desired.

Note also that the power circuitry 320 may include sensors and other circuitry for monitoring the power signals transmitted to any of the local components, as is described above for the display device 310. In this regard, the advertisement monitor 330 may receive sensor data indicative of the power signals received from the power supply 380 and analyze such sensor data to verify the operation of any local component receiving such power signals, such as network interface 380, content controller 370, and/or display device 310. For example, based on the sensed parameters, the advertisement monitor 330 may confirm that each local component is receiving power from the power supply 380.

If not, the advertisement monitor 330 may detect an occurrence of an operational problem and report such problem. The advertisement monitor 330 may also try to resolve the problem, such as checking the state of the switch 2525 coupled to the local component to ensure that it is closed.

The advertisement monitor 330 may also check the monitored power signal to any local component to determine whether it is in a normal operation range defined by an upper threshold and a lower threshold for each component. If the monitored power is determined to be outside of this normal range, the advertisement monitor 330 may detect and report an operational problem. In addition, as a local component is operating, it is expected that it will draw differing amounts of power as it performs different operations. The power signal to a local component may be indicative of an operational problem if the power signal remains too constant for an extended time even if the power signal is in a normal operating range. Thus, the advertisement monitor 330 may be configured to analyze fluctuations of the power signal to any of the local components and detect an operational problem with such local component if the power signal is not fluctuating by at least a threshold amount for an extended time. If the advertisement monitor 330 detects an operational problem with a local component in any of the examples described herein, the advertisement monitor 330 may report the problem to the server 350 or other location and/or perform an action for addressing or mitigating the problem, such as initiating a reboot of the local component, as described above.

The above embodiments are described above in the context of advertising. However, a content monitor and display system similar to the advertisement monitor and advertisement display systems described above may be used to monitor the operation of other types of display systems outside of advertisements, such as weather display systems, systems for reporting various types of notifications, and other types of signage.

In some embodiments, the advertisement monitor 330 may be coupled to various sensors that are used to sense intrusion, and the advertisement monitor may be configured to sense the presence of unauthorized persons in a controlled or private area. As an example, the advertisement monitor 330 may be coupled to a motion sensor or a sensor used to detect when a door or window is opened. During certain times of the day, the presence of a person in a controlled area may be unexpected or indicative of unauthorized entry. The advertisement monitor 330 may be configured to determine when an event sensed by an intrusion sensor is indicative of the presence of an unauthorized person in a controlled or secure area, and the advertisement monitor 330 may be configured to take one or more actions in response to such event, such as reporting the event or triggering an alarm.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein including but not limited to arranging parts and functions in different orders while achieving the same or similar results. Accordingly, it is emphasized that this disclosure is not limited to the explicitly disclosed methods, systems, and apparatuses, but is intended to include variations to and modifications thereof, which are within the spirit of the following claims.

Now, therefore, the following is claimed:

1. A system for displaying electronic content, comprising:
    a display device;
    a network interface configured to receive video data from a network, the video data defining at least one advertisement;
    a content controller configured to receive the video data from the network interface and to output a video stream of the video data defining the at least one advertisement for display of the at least one advertisement by the display device;
    an optical sensor positioned to sense light from the display device and provide sensor data indicative of the sensed light; and
    a content monitor coupled between the display device and the content controller, the content monitor configured to receive the sensor data from the optical sensor and the video stream from the content controller, the content monitor configured to compare at least a portion of the video data to the sensor data and to transmit the video data from the content monitor, wherein the display device is configured to display the video data transmitted by the content monitor, and wherein the content monitor is further configured to detect a first error associated with display of the at least one advertisement by the display device based on a comparison of the portion to the sensor data and to transmit a notification indicative of the detected first error.

2. The system of claim 1, wherein the video data received by the network interface is compressed, and wherein the content controller has a frame buffer, the content controller configured to decompress the video data into uncompressed image frames indicative of the at least one advertisement, the content controller further configured to the store the uncompressed image frames in the frame buffer, wherein the video stream includes the uncompressed image frames.

3. The system of claim 1, wherein the content monitor, in response to detection of the first error, is configured to initiate a reboot of at least one of the group including:
    the display device, the content controller, and the network interface.

4. The system of claim 3, wherein the content monitor is configured to initiate the reboot by temporarily interrupting a power signal transmitted to the at least one of the group.

5. The system of claim 4, wherein the system further comprises a relay coupled to the at least one of the group, and wherein the content monitor is configured to control the relay for temporarily interrupting the power signal.

6. The system of claim 1, wherein the display device is powered by a power signal transmitted to the display device, wherein the content monitor is configured to monitor fluctuations of the power signal while the display device is displaying the at least one advertisement, and wherein the content monitor is configured to detect a second error associated with display of the at least one advertisement by the display device based on the fluctuations and to transmit a notification indicative of the detected second error.

7. The system of claim 1, wherein the optical sensor is held by a sensor housing having a tab inserted into a gap between a display screen of the display device and a frame of the display device.

8. The system of claim 1, wherein the optical sensor is detachably coupled to the display device.

9. The system of claim 8, wherein the content monitor is mounted on the display device.

10. The system of claim 1, wherein the content monitor, in response to detection of the first error, is configured to initiate a reboot of the display device.

11. The system of claim 10, wherein the content monitor is configured to initiate the reboot by temporarily interrupting a power signal transmitted to the display device.

12. The system of claim 1, wherein the content monitor is configured to insert graphical content into the portion of the video data.

13. The system of claim 12, wherein the content monitor is configured to determine based on the sensor data whether the graphical content is displayed by the display device.

14. The system of claim 13, wherein the content monitor is configured to identify the at least one advertisement displayed by the display device based on the graphical content.

15. The system of claim 1, wherein the content monitor has a frame buffer for buffering the video data, and wherein the content monitor is configured to insert graphical content into a portion of the frame buffer and to calibrate the optical sensor for use with the display device based on the graphical content.

16. The system of claim 15, wherein the content monitor, in calibrating the optical sensor, is configured to identify a set of pixels of the display device within a field of view of the optical sensor based on the graphical content.

17. The system of claim 1, wherein the content monitor has a frame buffer for buffering the video data, and wherein the content monitor is configured to transmit image frames of the video data in the frame buffer to a remote server.

18. The system of claim 1, wherein the display device has a display screen for displaying images, wherein the display device has a bevel extending along an edge of the display screen, and wherein the optical sensor is held by a sensor housing having a tab inserted into a gap between the display screen and the bevel.

19. The system of claim 1, wherein the content monitor is configured to store data indicative of the at least one advertisement, and wherein the content monitor is configured to compare the video data to the data indicative of the at least one advertisement.

20. The system of claim 19, wherein the content monitor is further configured to detect a second error associated with the content controller based on a comparison of the video data to the data indicative of the at least one advertisement.

21. A content monitor, comprising:
an input/output interface coupled to a display device, an optical sensor, and a content controller such that the content monitor is coupled between the display device and the content controller;
at least one processor programmed with instructions that, when executed by the at least one processor, cause the content monitor to:
receive, from the content controller, a video stream of video data defining at least one advertisement for display by the display device, the video data transmitted to the content controller through a network via a network interface;
transmit the video data to the display device;
receive, from the optical sensor, sensor data indicative of light from the display device sensed by the optical sensor;
compare at least a portion of the video data to the sensor data;
detect an error associated with display of the at least one advertisement by the display device based on a comparison of the portion to the sensor data; and
transmit a notification in response to detection of the error.

22. A method for displaying electronic content, comprising:
receiving, with a content monitor, a video stream transmitted from a content controller, the video stream including the video data received by the content controller from a network via a network interface;
transmitting the video data from the content monitor to a display device;
sensing light from the display device with an optical sensor while the display device is displaying the video data transmitted by the content monitor;
receiving, by the content monitor from the optical sensor, sensor data indicative of the sensed light;
comparing, by the content monitor, at least a portion of the video data to the sensor data;
detecting, with the content monitor, a first error associated with display of the at least one advertisement by the display device based on the comparing; and
transmitting a notification from the content monitor in response to the detecting the first error.

23. The method of claim 22, wherein the video data received by the content controller is compressed, and wherein the method further comprises:
converting, with the content controller, the video data received by the content controller into uncompressed image frames indicative of the at least one advertisement;
storing the uncompressed image frames in a frame buffer of the content controller; and
transmitting the video stream including the uncompressed image frames from the content controller.

24. The method of claim 23, further comprising initiating, with the content monitor in response to the detecting the first error, a reboot of at least one of the group including:
the display device, the content controller, and the network interface.

25. The method of claim 22, wherein the optical sensor is held by a sensor housing contacting a display screen of the display device.

26. The method of claim 22, wherein the display device is powered by a power signal transmitted to the display device, and wherein the method further comprises:
monitoring, with the content monitor, fluctuations of the power signal while the display device is displaying the at least one advertisement;
detecting, with the content monitor, a second error associated with display of the at least one advertisement by the display device based on the monitoring; and
transmitting a notification from the content monitor in response to the detecting the second error.

27. The method of claim 22, wherein the optical sensor is held by a sensor housing having a tab, and wherein the method further comprises inserting the tab into a gap between a display screen of the display device and a frame of the display device.

28. The method of claim 22, further comprising initiating, with the content monitor, a reboot of the display device in response to the detecting the first error by temporarily interrupting a power signal transmitted to the display device.

29. The method of claim 22, further comprising:
inserting, with the content monitor, graphical content into the portion of the video data; and
determining, with the content monitor based on the sensor data, whether the graphical content is displayed by the display device.

30. The method of claim 22, further comprising:
buffering the video data in a frame buffer of the content monitor; and calibrating the optical sensor for use with the display device, the calibrating comprising inserting graphical content into a portion of the frame buffer and identifying a set of pixels of the display device within a field of view of the optical sensor based on the graphical content.

* * * * *